United States Patent

Vogl

[15] 3,668,184

[45] June 6, 1972

[54] CHLORAL COPOLYMERS

[72] Inventor: Otto F. Vogl, Wilmington, Del.

[73] Assignee: E. I. du Pont de Nemours and Company, Wilmington, Del.

[22] Filed: Dec. 19, 1969

[21] Appl. No.: 886,739

Related U.S. Application Data

[63] Continuation-in-part of Ser. No. 731,622, May 23, 1968, abandoned, which is a continuation-in-part of Ser. Nos. 580,217, Sept. 19, 1966, abandoned, and Ser. No. 558,631, June 29, 1966, abandoned.

[52] U.S. Cl. ............... 260/67 TN, 117/124 E, 117/126 GR, 117/137, 260/2.5 F, 260/29.2 TN, 260/30.4 N, 260/31.2 N, 260/31.8 S, 260/31.8 F, 260/32.4, 260/32.8 N, 260/33.2 R, 260/33.6 F, 260/33.6 UB, 260/33.8 F, 260/33,8 UB, 260/37 N, 260/37 P, 260/45.8 A, 260/45.8 NZ, 260/45.9 P, 260/64, 260/67 R, 260/67 S, 260/96 R, 260/598

[51] Int. Cl. .................................... C08g 1/12, C08g 9/18

[58] Field of Search ................................. 260/67 TN

[56] References Cited

UNITED STATES PATENTS 3,265,665   8/1966   Mantell et al. .................. 260/67 TN
3,277,058   10/1966   Bastian .............................. 260/67 TN
3,454,527   7/1969   Vogl .................................. 260/67 R

OTHER PUBLICATIONS

Takida et al., Kobunski Kagaku (Chemistry of High Polymers, Japan) 22, 463– 472, July 1965.

*Primary Examiner*—William H. Short
*Assistant Examiner*—L. M. Phynes
*Attorney*—Anthony P. Mentis

[57] ABSTRACT

Chloral is copolymerized with one or more isocyanate, isothiocyanate, diisocyanate, diisothiocyanate or ketene compounds to produce copolymers which are nonflammable and which can be made into a variety of useful, shaped objects. The process of making the copolymers involves preparing a homogeneous mixture of monomers and polymerization initiator at a temperature above the threshold polymerization temperature of the mixture, cooling the homogeneous mixture below the threshold polymerization temperature and maintaining the homogeneous mixture quiescent during the polymerization.

25 Claims, No Drawings

CHLORAL COPOLYMERS

CROSS-REFERENCE TO RELATED APPLICATIONS

This application is a continuation-in-part of my application Ser. No. 731,622 filed May 23, 1968, which in turn was a continuation-in-part of my applications Ser. No. 580,217 filed Sept. 19, 1966 and Ser. No. 558,631 filed June 20, 1966, all of which are now abandoned.

BACKGROUND OF THE INVENTION

1. Field of the Invention

This invention relates to a new class of copolymers of chloral with at least one isocyanate, isothiocyanate, diisocyanate, diisothiocyanate or ketene and process for their preparation.

2. Description of Prior Art

Applicant's U.S. Pat. No. 3,454,527 issued July 8, 1969, discloses homopolymers of chloral prepared by a process which involves preparing a uniform mixture of chloral and polymerization initiator at a temperature above the threshold polymerization temperature of the mixture, cooling the uniform mixture below the threshold polymerization temperature, and maintaining the mixture quiescent during the polymerization.

U.S. Pat. No. 3,265,665 issued to Mantell et al. on Aug. 9, 1966 discloses copolymers of formaldehyde and isocyanates by a polymerization process which involves cooling to low temperatures. Chloral is not disclosed nor suggested and quiescent conditions are not maintained during the polymerization process.

Takida et al., Kobunski Kagaku [Chemistry of High Polymers, Japan] 22, 463–472, July 1965, show the copolymerization of chloral with phenyl isocyanate at low temperatures but do not use quiescent polymerization conditions. Their process produced only crumbly, powdery products.

DESCRIPTION OF THE INVENTION

This invention is directed to addition copolymers of chloral and at least one comonomer selected from the group consisting of

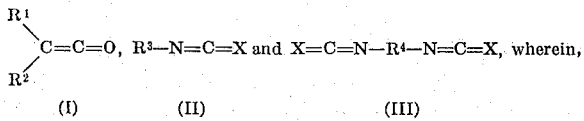

(I)    (II)    (III)

X is selected from the group consisting of oxygen and sulfur;

$R^1$ and $R^2$, alike or different and separately or jointly, are selected from the group consisting of (1) monovalent groups selected from the group consisting of hydrogen, cyano, lower alkoxycarbonyl, and unsubstituted and substituted hydrocarbyl and hydrocarbyloxy in which any hydrocarbyl moiety is of one to 18 carbon atoms selected from the group consisting of alkyl, cycloalkyl, aryl, aralkyl and alkaryl, and any substituent is selected from the group consisting of lower alkoxy, fluorine, chlorine, bromine, and iodine; and (2) divalent groups selected from alkylene of two to seven carbons;

$R^3$ is selected from the group consisting of non-substituted and substituted alkyl and cycloalkyl of up to 18 carbons, aryl of six to 18 carbons and alkaryl and aralkyl of seven to 24 carbons, any substitution being selected from the group consisting of fluorine, chlorine, bromine, iodine, nitro, cyano, phenylazo, $-NY_2$, $-OY$, $-SY$,

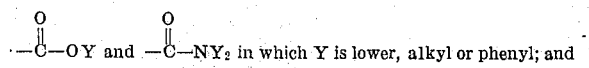

$-\overset{O}{\overset{\|}{C}}-OY$ and $-\overset{O}{\overset{\|}{C}}-NY_2$ in which Y is lower, alkyl or phenyl; and $R^4$ is selected from the group consisting of non-substituted and substituted alkylene, alkarylene, aralkylene, cycloalkylene, alkylenebis(cycloalkylene), alkylenebis(arylene), arylene, arylenebis(alkylene) of up to 18 carbons and anthraquinonylene, any substitution being selected from the group consisting of fluorine, chlorine, bromine, iodine, nitro, cyano, phenylazo, $-NY_2$, $-OY$, $-SY$,

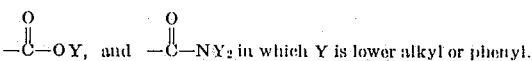

Either one or a plurality of ketenes, isocyanates, isothiocyanates, diisocyanates, and/or diisothiocyanates may be reacted with alcohol.

In the above definition of $R^1$ and $R^2$, preferred hydrocarbyl moieties are alkyl of one to 18 carbon atoms, cyclo- lower alkyl, phenyl, naphthyl, benzyl, tolyl, mesityl and duryl.

As illustrated below, the hydrocarbylene or substituted hydrocarbylene group $R^4$ may involve aliphatic, cycloaliphatic, and aromatic structures with the two isocyanate or isothiocyanate groups stemming from aliphatic or aromatic carbon atoms. The $R^1$, $R^2$, $R^3$ and $R^4$ structures pass unchanged through the polymerization reaction.

The ketene copolymers of this invention are addition polymers which may generally be represented by Formula IV

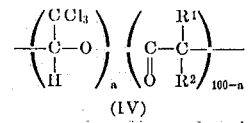

(IV)

in which a represents the mol percentage of chloral units and 100-a represents the mole percentage of ketene units in the copolymer and $R^1$ and $R^2$ are as defined above. Each copolymer molecule contains at least four chloral units.

The isocyanate, isothiocyanate, diisocyanate and diisothiocyanate copolymers of this invention are addition polymers which may generally be represented by Formulas V and VI

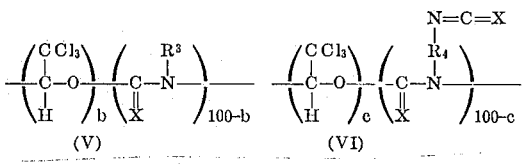

(V)    (VI)

in which b and c represent the mol percentage of chloral units and 100-b and 100-c represent respectively the mol percentage of isocyanate and diisocyanate units in the copolymer, and $R^3$ and $R^4$ are as defined above. Each copolymer molecule contains at least four chloral units.

It will be understood that more than one compound of Formulas I, II and III can be polymerized with chloral in the process of this invention. The invention thus includes an addition copolymer of chloral and at least one comonomer selected from at least two of the groups or Formulas, I, II and III.

The ketene, isocyanate, isothiocyanate, diisocyanate and diisothiocyanate copolymers of this invention also include branched and crosslinked products in which both N C X groups of compounds of Formula III polymerize with chloral to form network structures, for which no simple recurring structural formula can be drawn.

The copolymers of this invention contain from 1 to 99.9 mol percent of chloral and in general have better thermal stability than polychloral. Copolymers having about 50 to 99.9 mol percent of chloral are a preferred class. Even more preferred are copolymers having about 80 to 99.9 mol percent of chloral. The copolymers may range from soluble, fusible products to insoluble, infusible products depending on the specific ingredients used and their proportions.

Copolymers containing from about 80 up to 99.9 mol percent of chloral and a corresponding 0.1 up to about 20 mol percent of comonomer are usually insoluble in common organic solvents such as methanol, ethanol, acetone, benzene, toluene, chloroform, carbon tetrachloride, tetrachloroethylene, ethyl acetate, etc., and are substantially infusible at temperatures up to their decomposition point. Where the chloral content of the copolymer is below about 80 mol percent the products are generally soluble and fusible. It is to be noted however, that the 80 mol percent of chloral content does not always form the line of demarcation. The specific comonomer used, that is, isocyanate, ketene, diisocyanate, etc. has an effect on the characteristics of the final polymer. For example in chloralisocyanate copolymers having less or more than 80 mol percent of chloral, some may be soluble and infusible, or fusible and insoluble, depending on the particular comonomer isocyanate used to make the copolymer.

The process of preparing the copolymers comprises cryotachensic polymerization. This involves forming a homogeneous mixture of the monomers, an anionic polymerization initiator, and 0 to 99 percent by weight of the total composition of an aprotic solvent, at a temperature above the threshold polymerization temperature of the mixture, cooling the homogeneous mixture below the threshold temperature whereby polymerization occurs, and maintaining the mixture at such lower temperature until polymerization subsides. A critical aspect is that the polymerization mixture is undisturbed, that is, it remains quiescent during polymerization whereby the mixture initially forms a continuous gel which ultimately converts to high polymer. If the mixture is disturbed or agitated during polymerization, the resultant polymer has diminished strength, toughness and infrangibility.

The cryotachensic polymerization process generally involves preparing a homogeneous mixture of the monomers and polymerization initiator and copolymerizing the monomers simultaneously by cooling. It is to be understood however that the process also includes partial polymerization of chloral alone, followed by reaction with the other comonomers. In this variation of the process a uniform mixture of only chloral and polymerization initiator, with or without aprotic solvents, is prepared at a temperature above the threshold polymerization temperature of the mixture. The mixture is then cooled below its threshold polymerization temperature under quiescent conditions to partially polymerize the chloral to polychloral. The other comonomer or comonomers are then added to the reaction vessel and caused to copolymerize with chloral under conditions which may be quiescent or not. It is believed the added material copolymerizes not only with the remaining free chloral but also forms block copolymers with the polychloral.

The initiator is always uniformly distributed in the monomer mixture before any polymerization occurs. Thus, when polymerization is brought about by cooling the composition below the threshold polymerization temperature, the composition generally becomes gelled and unflowable within one minute or less. The degree of conversion of monomers to copolymer increases with time but generally is substantially complete within one hour. The order of addition may be varied but in general the initiator is preferably added after the addition of solvent, if any is used; or the initiator may be added in solution.

The threshold polymerization temperature of a polymerization mixture containing monomeric chloral, one or more ketenes and/or one or more isocyanates, isothiocyanates, diisocyanates or diisothiocyanates and an initiator, and optionally a solvent, is determined as follows: The mixture is prepared and thoroughly blended at an elevated temperature, for example, at its reflux temperature or at 65° C., whichever is lower. The mixture is then stirred and cooled at a rate of 2° C./min., the stirring being conducted to insure uniform cooling of the entire mass of liquid. The threshold polymerization temperature is that temperature at which there is noted the first haziness or opalescence due to solid copolymer separating in the mixture.

The monomer-initiator-solvent compositions have threshold polymerization temperatures in the range from 0°–60 C. The threshold temperature is affected by both the nature and the amount of the ketene, isocyanate, isothiocyanate, diisocyanate or diisothiocyanate comonomers and any aprotic liquid and its amount present. The maximum temperature at which the polymerization mixture is prepared is not critical and generally falls between the threshold polymerization temperature of the particular mixture and the reflux temperature thereof. Generally speaking, the threshold polymerization temperature is highest with monomers per se while reaction mixtures containing solvents show lower threshold polymerization temperatures. Mixtures containing about 25 percent chloral by volume have threshold polymerization tempreatures near room temperature.

Copolymerization of the monomers in the polymerization mixture can be conducted at the threshold polymerization temperature. However, the heat of polymerization is most readily dissipated and the toughness and molecular weight of the polymer are increased if a polymerization temperature of at least 5° C. below the threshold polymerization temperature is used, and preferably the temperature is at least 25° C. below and still more preferably, at least 50° to 135° C. below the threshold polymerization temperature. Cooling to the desired low temperature may be accomplished by any means known to the art.

The cryotachensic polymerization process can be carried out in the presence of air. However, it is preferred to use an atmosphere to which the monomers and the initiator are inert. Thus, it is desirable to exclude moisture, oxygen, carbon dioxide, acidic or basic vapors, and vapors of protic solvents. An inert atmosphere is preferred when pure monomers are to be held for substantial lengths of time prior to polymerization and is particularly advantageous when it is desired to hold a mixture containing the monomers and a polymerization initiator above the threshold polymerization temperature of the composition for more than a few minutes. An inert atmosphere may be obtained by operating at reduced pressures, by operating in nitrogen, helium, or the like, or by other means known in the art.

It is preferable to bring about polymerization by cooling the polymerization mixture below its threshold temperature within a short time after contact of the initiator with the monomers. For example, it is preferable to carry out polymerization within one hour after contact of monomers with the catalyst and more preferably within ten minutes or less.

Polymerization initiators suitable for use in the present process are essentially those of my previously mentioned coassigned application, Ser. Nos. 580,217, 558,631 and 731,622, and include all of those known to initiate anionic polymerization. Effective initiating amounts of initiator are generally between 0.001 and 10 percent of the combined weight of chloral and comonomer(s); preferred amounts are 0.005 to 5 percent by weight. Many of the initiators are Lewis bases. Examples of initiators include: (a) tertiary organic compounds of elements of Group V-A of the Periodic Table, i.e., compounds $QR_3$, where Q is N, P, As, Sb, or Bi, and R is a hydrocarbyl group containing one to 18 carbon atoms with the proviso that when Q is N, no more than one R can be aryl. The R groups may be alike or different and can be taken together to indicate the hydrocarbon part of a cyclic 5- to 7-membered ring system in which Q is a heteroatom as in pyridine, substituted pyridines such as trimethylpyridine, quinoline, triethylenediamine, and alkyl, aryl and benzo derivatives of such compounds. Thus the hydrocarbyl groups may be alkyl as in methyl, ethyl, dodecyl and octadecyl, alkenyl as in 9-octadecenyl, aryl as in phenyl, naphthyl, anthryl and benzanthryl, cycloalkyl as in cyclopropyl, cyclopentyl, cyclohexyl and cycloheptyl, aralkyl as in benzyl and phenethyl, alkaryl as in tolyl and xylyl; and the like; (b) onium, particularly ammonium, phosphonium and sulfonium fluorides, chlorides, bromides, iodides, hydroxides, alkoxides, thialkoxides, carboxylates, cyanamides, cyanates, thiocyanates and azides. The onium cations may be hydrocarbyl substituted, the hydrocarbyl groups being as described for the first group of initiators; (c) Group IA, Group IIA, or Group IIIA metal hydrides, hydroxides, halides, alkyls, alkoxides, carboxylates, cyanamides, cyanates, thiocyanates, and azides, and particularly lithium chloride and similar halides; and (d) phosphine and phosphonium compounds wherein the phosphorous atom carries one or more substituents such as: hydrocarbyl groups (as described under (a) above for the first group of initiators); hydrocarbyl groups containing halogen; and hydrocarbyl groups and halogenated hydrocarbyl groups connected to P through oxygen or sulfur. The Periodic Table referred to herein is that set forth in Deming's, General Chemistry, John Wiley and Sons, Inc., New York, 5th Edition, 1944, Chapter 11.

The aprotic solvents, when used as reaction media, must be unreactive with the monomers and the initiator and preferably should be good solvents for each. The resulting polymerization mixture must be homogeneous at the threshold polymerization temperature. Aromatic and aliphatic hydrocarbons, as well as ethers, nitriles and ketones, are preferred. Toluene is particularly preferred. Halocarbons such as carbon tetrachloride, esters and amines such as N,N-dimethylformamide and N,N-dimethylacetamide are operable if the polymerization is carried out within less than 1 hour and particularly less than a few minutes after mixing of the monomers with the solvent and initiator. Specific solvents suitable for use in the polymerization according to this invention include benzene, n-hexane, cyclohexane, diethyl ether, anisole, acetone, cyclohexanone, methyl ethyl ketone, ethyl acetate, acetonitrile, nitrobenzene, methylene chloride, chloroform, tert-butyl chloride, dimethyl sulfoxide, tetramethylurea, hexamethylphosphoramide and the like. Amounts of aprotic liquid up to 10 percent by weight aid in solubilizing the initiator in the monomers. High concentrations of aprotic liquid can assist in the application of the unpolymerized mixture as a paint, or for dipping, impregnating and coating operations prior to cooling to bring about polymerization.

With initiators which are readily soluble in the warm monomer mixture, no added liquid is required for dispersing purposes. A small amount of such liquid, however, may be desirable to permit shrinkage of the bulk copolymer by evaporation of the liquid after polymerization. This is sometimes useful in providing for removal of complicated solid shapes from the molds in which they are prepared.

The polymerization mixture can be prepared in the mold in which the polymer is to be formed or the mixture can be prepared in another container and then transferred to the mold which is at a temperature above the threshold polymerization temperature and which is then cooled therebelow to bring about polymerization.

The compositions are useful either as unfilled compositions or filled compositions containing up to about 70 percent by weight of a filler or reinforcing agent. All filler types known in the polymer art, whether inorganic or organic, may be used. Included are pigments; glass in the form of flakes, fibers, filaments, fabrics, roving, mat, powder, hollow fibers, glass balloons and the like; carbon in the form of carbon black, fibers and graphite; silicas such as diatomaceous earth, fibrous quartz, pulverized quartz, ground silica and pyrogenic silica; boron and metals in the form of a powder, wool or fiber including iron, steel, aluminum, bronze, copper, lead, silver, gold and the like; metal oxides such as iron oxide, alumina, titania, alumina fibers or "whiskers," sapphire "whiskers," titania "whiskers," and the like; salts such as calcium silicate, talc, clays, mica, calcium carbonate, barium ferrite, barium sulphate, boehmite, vermiculite, molybdenum disulfide, asbestos, fibrous barium sulfate, calcite, and the like; dyes; fibers derived from natural or synthetic sources including wool, nylon, polyacrylonitrile, polyethylene terephthalate, polypropylene, polypivalolactone and fluorocarbon plastics such as powder and fibers of polytetrafluoroethylene, polychlorotrifluoroethylene and the like; all as well known in the art.

One or more fillers may be mixed with the monomers, prior to or subsequent to the addition of the polymerization initiator, at a temperature above the threshold polymerization temperature of the mixture. The uniform mixture is then cooled below the threshold polymerization as described above.

The products of the invention are resistant to fire and high temperatures and this property makes them especially valuable in applications where resistance to high temperatures is desirable. The products may be used in their filled or unfilled state and because they are machinable, they may be made into a wide variety of durable, heat resistant shaped solids of all sorts such as chess men, dishes, cups, saucers bowls, balls, dolls and toys of all sorts. They can be made as heat and fire resistant: roofing tiles; architectural sheets and panels 1 inch or more in thickness; house drain gutters; heater housings; motor coil insulation; structural or resilient foams; fibers for fire resistant cloth, clothing, drapes, rugs and carpets, etc; fibrids for making heat resistant paper; tough films for packaging and wrapping; potting resins for embedding objects of all kinds; etc., etc.

By employing equipment capable of moving the homogeneous polymerizable mixture of monomers and initiator from a temperature zone above its threshold polymerization temperature through a cooling, polymerization zone to a polymer discharge area, it is possible to carry out the polymerization process on a continuous basis without agitating the polymerization mixture. Continuous polymerization in this manner is suitable for preparing films, sheeting, beading, rods, tubes, pipes and similar shaped objects commonly prepared from other polymers by melt extrusion. Belt casting of transparent sheeting and films is particularly well adapted to this mode of operation.

The internal physical make-up of the shaped chloral copolymers prepared according to this invention is such as to permit ready removal of any solvent or unpolymerized monomers by evaporation, extraction or other common means. This same make-up permits ready access to the interior of large moldings by gaseous reagents or solutions of agents for post-treatment or stabilization, or by solvents for removing initiator residues. Post-treatments of the copolymers with benzoyl chloride, acetic anhydride, and phosphorus pentachloride can be performed.

EMBODIMENTS OF THE INVENTION

The following non-limiting examples further illustrate the invention. Parts and percentages are by weight unless otherwise noted.

EXAMPLE 1

Copolymer of Chloral and Phenyl Isocyanate

A mixture of 160 ml. of chloral and 160 ml. of toluene was added to a 1-liter round-bottom flask equipped with a nitrogen inlet and outlet, a reflux condenser, a mechanical stirrer and a thermometer. To this mixture, which was at a temperature of 25° C., there was added with rapid stirring a solution of 0.30 g. of lithium tert-butoxide in 480 ml. of dried toluene. The stirring was discontinued after the mixture had become completely homogeneous and it was determined that its threshold polymerization temperature was 22° C. When the mixture became quiescent, that is, was no longer in an agitated state, the flask containing the quiescent mixture was cooled down to and held at −78° C. for 16 hours while maintaining the mixture in its quiescent state. At the end of the 16 hours some of the chloral had homopolymerized to a solid gel. The flask was then connected to an oil pump and held under reduced pressure for a period of 24 hours to remove most of the solvent. During this time the flask and its contents were allowed to warm up to room temperature. 50 ml. of phenylisocyanate was added to the flask containing the coalesced mixture of chloral monomer and chloral homopolymer and allowed to react for 16 hours. After that time excess phenyl isocyanate was drained off and the flask broken. The polymer was washed with toluene, and dried. 155 g. of copolymer was obtained in spherical form reflecting the shape of the container in which it was made. Characterization of this polymer by nitrogen analysis (Found: N, 0.89%, 0.99%) showed that 10 mole percent of phenyl isocyanate had copolymerized. The polymer was tough and insoluble in common organic solvents.

EXAMPLE 2

Copolymer of Chloral and Phenyl Isocyanate

In a procedure similar to that of Example 1, a mixture of 200 ml. of chloral and 600 ml. of toluene containing 0.27 g. of lithium tert-butoxide (threshold polymerization temperature 30° C.) was prepared at a temperature above 30° C. The quiescent, homogeneous mixture was cooled down to and held at −78° C. for 16 hours. To the resulting gel mixture of polychloral and chloral monomer (approximately 30 percent of the monomer initially charged) was added 100 ml. of a 20 percent (by volume) solution of phenyl isocyanate in toluene. After 8 hours, solvent and excess phenyl isocyanate were removed under reduced pressure and the product was washed in toluene and dried to obtain 237.5 g. of polymer containing 8 mol percent of copolymerized phenyl isocyanate. This copolymer was also tough and insoluble in common organic solvents.

EXAMPLE 3

Copolymer of Chloral and Phenyl Isocyanate

Part A

In a dry test tube (18 × 200 mm.), which was blanketed with nitrogen, a mixture of 30 g. of freshly distilled chloral and 2.7 g. of freshly distilled phenyl isocyanate was heated in an oil bath to 65° C. A 1 molar solution of lithium tert-butoxide (0.4 ml.) in cyclohexane was then added. The threshold polymerization temperature of this mixture was 47° C. One part of the initiated mixture was left in the test tube until the mixture became quiescent and the tube was then placed without shaking into a −50° C. bath. Polymerization commenced almost immediately. The polymerization was essentially complete in one hour. The tube containing the copolymer was taken out of the cooling bath and allowed to come to room temperature. The plug of chloral-phenyl isocyanate copolymer was removed from the test tube and washed with carbon tetrachloride. Elemental analysis for C, H, and N (see Table I) indicated that the polymer contained 10 mole percent of phenyl isocyanate. The infrared spectrum showed a strong band at 5.70 $\mu$ indicative of a urethane linkage.

Part B

The other part of the initiated comonomer mixture was drawn into a warm syringe and placed between glass plates, separated by a 0.1 mm. gasket, at a temperature above 65° C. and allowed to become quiescent. The quiescent mixture was polymerized by cooling the assembly at −50° C. for 1 hour. The resulting film was washed with carbon tetrachloride. A clear film of chloral-phenyl isocyanate copolymer was obtained which was stiff and tough. The polymer was insoluble in common organic solvents. The thermal stability of this sample was substantially improved over the homopolymer of chloral. The 5 percent weight-loss temperature of the copolymer determined at a heating rate of 6° C./min. in nitrogen was 197° C. and 200° C. in two samples; typical samples of chloral homopolymer had a 5 percent weight-loss temperature in the range of 85°–120° C.

EXAMPLES 4–40

Similar copolymerizations of chloral were carried out with other isocyanates as comonomers. The procedures of Example 3, Parts A and B, were followed exactly and the results are shown in Table I which follows. In the table the modulus values refer to stiffness or tension.

TABLE I.—COPOLYMERIZATION OF CHLORAL WITH ISOCYANATES

| Ex. | Chloral (ml.) | Comonomer Type | Amount (ml.) | Mole percent chloral in feed | Copolymer analysis (percent) C | H | N | Mole percent chloral in polymer | Film properties, Part B Tensile strength (p.s.i.) | Elongation at break (percent) | Modulus (p.s.i.) |
|---|---|---|---|---|---|---|---|---|---|---|---|
| 3 | 20 | Phenyl isocyanate | 3 | 88 | 20.56 | 1.11 | 1.13–1.15 | 90 | 6,720 | 8.8 | |
| 4 | 20 | Methyl isocyanate | 3 | 80 | | | | | | | |
| 5 | 20 | n-Butyl isocyanate | 3 | 88.5 | 17.00 | 1.05 | 0.54–0.54 | 95 | 6,460 | 22.3 | 173,600 |
| 6 | 20 | Octadecyl isocyanate | 7 | 90 | 20.23 | 2.07 | 0.61–0.61 | 94 | 6,220 | 6.8 | |
| 7 | 20 | Dodecyl isocyanate | 5 | 90 | 19.88 | 1.37 | 0.58–0.57 | 95 | 6,880 | 20.8 | 225,000 |
| 8 | 20 | Isopropyl isocyanate | 3 | 86 | 16.81 | 0.75 | 0.35–0.35 | 97 | 6,300 | 18.8 | |
| 9 | 20 | Toluene diisocyanate | 3 | 90 | 21.27 | 1.24 | 2.22–2.30 | 89 | 5,490 | 9.8 | 171,000 |
| 10 | 20 | 1-naphthyl isocyanate | 3 | 86.5 | 16.96 | 1.20 | 0.47–0.37 | 95 | 6,950 | 29.3 | 149,000 |
| 11 | 20 | Ethyl isocyanate | 3 | 84 | 17.65 | 0.98 | 0.86–0.96 | 91 | 6,760 | 6.0 | |
| 12 | 10 | n-Butyl isocyanate | 2.85 | 80 | 18.74 | 1.21 | 0.86–0.91 | 91 | 7,120 | 12.3 | 300,000 |
| 13 | 20 | n-Butyl isocyanate | 2.25 | 91 | 17.15 | 0.91 | 0.55–0.41 | 95 | 6,870 | 16.8 | 221,000 |
| 14 | 20 | n-Butyl isocyanate | 1.15 | 95 | 17.37 | 0.89 | 0.46–0.45 | 95 | 7,430 | 16.5 | 115,000 |
| 15 | 20 | n-Butyl isocyanate | 0.57 | 97.5 | 16.77 | 1.00 | 0.21–0.24 | 97.5 | 5,800 | 9.3 | 264,000 |
| 16 | 20 | α,α,α',α'-tetramethylxylylene diisocyanate (g.) | 3 | 94 | 15.81 | 0.86 | 0.08–0.11 | 99.4 | 4,610 | 32.5 | 181,000 |
| 17 | 20 | 4,4'-diisocyanatodicyclohexylmethane | 3 | 94.5 | 16.32 | 0.89 | 0.25–0.24 | 97.5 | 5,590 | 23.0 | |
| 18 | 20 | Hexamethylene diisocyanate | 3 | 91 | 18.83 | 1.24 | 1.17–1.23 | 94 | 5,810 | 7.8 | 182,000 |
| 19 | 20 | Phenyl isothiocyanate (g.) | 2.65 | 91 | 16.70 | 1.24 | 0.13–0.13 | 98.7 | 4,500 | 15.3 | 215,000 |
| 20 | 20 | n-Butyl isothiocyanate (g.) | 2 | 92.5 | | | 0.13 | 98.7 | | | |
| 21 | 20 | Methyl isothiocyanate (g.) | 1.5 | 91 | | | 0.19 | 98.4 | | | |
| 22 | 20 | Methyl isocyanate (g.) | 1 | 93 | | | 0.93 | 91.6 | | | |
| 23 | 20 | 2,5-dichlorophenyl isocyanate (g.) | 2 | 95 | | | 0.36 | 96 | | | |
| 24 | 20 | 3,4-dibromophenyl isocyanate (g.) | 6.1 | 90 | 16.87 | 0.72 | 0.52 | 95 | | | |
| 25 | 20 | p-Bromophenyl isocyanate (g.) | 3.96 | 91 | | | 0.89 | 90 | 7,020 | 17.3 | |
| 26 | 20 | o-Chlorophenyl isocyanate (g.) | 3.07 | 91 | | | 0.77 | 91.6 | 6,930 | 31.8 | |
| 27 | 20 | m-Chlorophenyl isocyanate (g.) | 3.07 | 91 | | | 1.00 | 89 | 6,780 | 16.3 | |
| 28 | 20 | p-Chlorophenyl isocyanate (g.) | 3.07 | 91 | | | 1.12 | 87.5 | 8,620 | 40.8 | |
| 29 | 20 | o-Methoxyphenyl isocyanate (g.) | 2.98 | 91 | | | 0.94 | 90 | 7,020 | 17.8 | |
| 30 | 20 | p-Methoxyphenyl isocyanate (g.) | 2.98 | 91 | | | 1.03 | 89 | 6,470 | 20.3 | |
| 31 | 20 | o-Ethoxyphenyl isocyanate (g.) | 3.26 | 91 | | | 0.93 | 90 | 6,390 | 17.3 | |
| 32 | 20 | p-Ethoxyphenyl isocyanate (g.) | 3.26 | 91 | | | 1.01 | 89 | 6,540 | 17.8 | |
| 33 | 20 | o-Nitrophenyl isocyanate (g.) | 3.24 | 91 | | | 0.93 | 95 | 5,210 | 28.8 | |
| 34 | 20 | m-Nitrophenyl isocyanate | (¹) | 94 | | | 1.39 | 93 | 5,510 | 5.5 | |
| 35 | 20 | p-Nitrophenyl isocyanate | (¹) | 97 | | | 1.42 | 93 | 4,470 | 4.0 | |
| 36 | 20 | o-Tolyl isocyanate (g.) | 2.66 | 91 | | | 1.28 | 87.5 | 7,250 | 25.0 | |
| 37 | 20 | m-Tolyl isocyanate (g.) | 2.66 | 91 | | | 0.62 | 94 | 6,890 | 20.5 | |
| 38 | 20 | p-Tolyl isocyanate (g.) | 2.66 | 91 | | | 0.62 | 94 | 7,130 | 28.8 | |
| 39 | 20 | Methylene diphenyl diisocyanate (g.) | 3.3 | 87 | | | | | 4,540 | 4.5 | |
| 40 | 20 | Octyl isocyanate (g.) | 3.0 | 92 | | | 0.12 | 98.7 | 5,910 | 50.0 | |

¹ Saturated solution.

EXAMPLE 41

Copolymer of Chloral and Phenyl Isocyanate

In a dried test tube, 4 ml. of chloral and 0.4 ml. of phenyl isocyanate were dissolved in 20 ml. of toluene. The resultant mixture was heated to 60° C. and 0.12 ml. of 1-molar lithium tert-butoxide in toluene was added thereto. The test tube was stoppered and the quiescent mixture was cooled to −20° C. The mixture set up in a few minutes to a transparent gel. After 1 hour, the tube was allowed to come to room temperature and to stand overnight. Toluene was partially removed under reduced pressure and the polymer plug was taken out of the test tube. The polymer gel had collapsed and was clear. Toluene and traces of unreacted monomers remaining in the polymer were allowed to evaporate at room temperature in the air. A coherent plug of chloral/phenyl isocyanate copolymer was obtained having the characteristic IR absorption of 5.70 μ.

| Example 43 | Charged Chloral, ml. | $C_6H_5NCO$ Ml. | $C_6H_5NCO$ Mol percent | Nature of resultant material containing the copolymer | Isolated copolymer, grams |
|---|---|---|---|---|---|
| A | 11.8 | 8.7 | 40 | Solid | 15.9 |
| B | 9.8 | 11.0 | 50 | do | 14.7 |
| C | 7.9 | 13.2 | 60 | do | 12.5 |
| D | 5.9 | 15.4 | 70 | Visc., clear | 8.8 |
| E | 5.9 | 15.4 | 70 | Very visc., clear | 9.1 |
| F | 4.9 | 16.5 | 75 | Visc., clear | 7.6 |
| G | 5.9 | 17.6 | 80 | Sl. visc., clear | 5.5 |

Copolymers A, B, and C were ground in methanol in a high speed blender. The particles were then washed thoroughly with methanol, then with acetone, and then dried. Materials D, E, F, and G were dissolved in benzene and then precipitated into a large volume of methanol. The resultant particles were washed with methanol, then with acetone, and finally dried.

The isolated polymers showed the following properties:

| Example 43 | Weight percent N | Mol percent $C_6H_5NCO$ | Inh. visc. 0.5% $CHCl_3$ 25° C. | Osmotic mol. wt. | Molds to clear film at ° C. | Decomp. temp., ° C. | Sol. in benzene |
|---|---|---|---|---|---|---|---|
| A | 0.98 | 10.3 | | | No | 270 | No. |
| B | 1.19 | 12.2 | | | No | 250 | No. |
| C | 1.47 | 15.0 | | | No | 270 | Partially. |
| D | 2.00 | 20.2 | 0.15 | 94,300 | | | Yes. |
| E | 1.70 | 17.2 | | 150,900 | No | 280 | Yes. |
| F | 1.84 | 18.8 | | 68,600 | | | Yes. |
| G | 2.04 | 22.2 | | 67,100 | 280-290 | 300 | Yes. |

EXAMPLE 42

Copolymer of Chloral and Phenyl Isocyanate

In a dried test tube, chloral (4 ml.) and phenyl isocyanate (0.4 ml.) were dissolved in 20 ml. of pentane. The mixture was heated to the boiling point and 0.15 ml. of 1-molar lithium tert-butoxide in cyclohexane was injected into the mixture. The threshold polymerization temperature of this mixture was 29° C. The test tube containing the resulting clear solution was stoppered and its contents allowed to become quiescent. The test tube was then placed without shaking in a bath at −20° C. After a few minutes, the contents polymerized to an opaque mass. After one hour the test tube was allowed to come to room temperature. The test tube was opened and some pentane was allowed to evaporate until the polymer shrank from the glass surface. The polymer was removed from the test tube and pentane and unreacted monomers allowed to evaporate completely (1 day). The polymer mass weighed 7.2 g. and had the shape and approximate volume of the test tube. The polymer was cut in half and the cut faces showed the physical structure of a foam of very fine pore size. The density of this foam was 0.35 (as compared to polychloral of 1.9). The infrared spectrum determined on a thin section of the foam showed the characteristic bands of a chloral-phenyl isocyanate copolymer especially the strong urethane band at 5.70 μ.

The following example illustrates the variation in characteristics produced by varying the proportions of the reactants.

EXAMPLE 43

Copolymer of Chloral and Phenyl Isocyanate

A series of test tubes were charged under nitrogen with chloral and phenyl isocyanate in the amounts indicated below and heated to 60° C. To each tube was then added 0.8 ml. of a one molar solution in chloroform of a polymerization initiator, 1/1 triisopropyl phosphine/chloral salt having the formula $$[(i-C_3H_7)_3POCH=CCl_2]^+Cl^-$$ 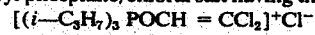

to form a homogeneous mixture (see example 105 C below for preparation of this initiator). After each mixture had become placid it was cooled without agitation to −25° C. and held at that temperature for 16 hours. The data below give the properties of the resultant copolymers.

Copolymer C contained a little soluble polymer. A 3-g. portion of the finely divided product which had been washed and dried as above was leached with benzene. The benzene solution was poured into methanol to give, after washing and drying, 0.8 g. of polymer having 1.66 wt. percent N (equal to 16.8 mole percent of $C_6H_5NCO$ content) and an inherent viscosity 0.17 measured at 0.5 percent in chloroform at 25° C.

All of these copolymers showed infrared absorption peaks characteristic of

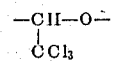

units derived from chloral and

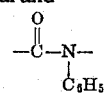

units derived from phenyl isocyanate.

EXAMPLE 44

Copolymer of Chloral, Butyl Isocyanate, Phenyl Isocyanate and 2,4-Diisocyanatotoluene In a 300 ml., round-bottom, glass flask were placed 250 ml. of chloral, 13 ml. of butyl isocyanate, 13 ml. of phenyl isocyanate, 13 ml. of 2,4-diisocyanatotoluene, and 0.25 g. of Celanthrene red dye. The flask was equipped with a stand pipe which was closed with a calcium chloride tube. The mixture was heated to 65° C. and 15 ml. of a 1-molar lithium tert-butoxide solution in cyclohexane was added to form a uniform mixture. The threshold polymerization temperature of this mixture was determined to be 47° C. After the mixture became quiescent, the flask and its contents was placed without agitation in a bath at −78° C. and polymerization commenced immediately. After 16 hours, the flask was brought to room temperature. The contents had polymerized completely to a bright-red, almost transparent sphere of chloral/butyl isocyanate/phenyl isocyanate/2,4-diisocyanatotoluene copolymer. The block was hard and tough, and had the exact shape of the vessel in which it was prepared.

Other examples of the copolymers of this invention are obtained when the following isocyanates, diisocyanates, isothiocyanates and diisothiocyanates are used in place of phenyl isocyanate, as for instance in the procedure of EXAMPLE 3:

methoxydifluoromethyl isocyanate;
2(4-ethylphenyl)1,1-dimethylethyl isocyanate;
2-benzo[b]thien-3-yl-1-methylethyl isocyanate;
1,5-naphthylene diisocyanate;
p-[bis-(2-chloroethyl)amino]phenyl isocyanate;
ethoxycarbonylmethyl isocyanate;
3-cyano-1-methyl-3,3-diphenylpropyl isocyanate;
o-cyanophenyl isocyanate;
1-diethylamino-1,2,2-trifluoroethyl isocyanate;
α,α-dimethylphenethyl isocyanate;
heptafluoropropyl isocyanate;
2-iodo-1-indanyl isocyanate;
4-phenylanthryl isocyanate;
2,6-anthraquinonylene diisocyanate;
3-benzyloxy-4-methoxyphenethyl isocyanate;
trifluoromethyl isocyanate;
1,2,3,4,4a,9,10,10a-octahydro-7-isopropyl-1,4a-dimethyl-1-phenanthryl isocyanate;
2,4,6-triiodophenyl isocyanate;
abietyl isocyanate;
6-fluoro-2-pyridyl isocyanate;
1-adamantyl isocyanate;
3,3,3-trinitropropyl isocyanate;
2-(phenylthio)ethyl isocyanate;
p-phenylazophenyl isocyanate;
benzyl isothiocyanate;
butyl isocyanatoacetate;
p-bromophenyl isothiocyanate;
p-butoxyphenyl isothiocyanate;
o-chloro-α-phenylbenzyl isothiocyanate;
14-cyanotetradecyl isothiocyanate;
cyclohexyl isothiocyanate;
cyclooctyl isothiocyanate;
2-diethylaminoethyl isothiocyanate;
2,2-difluoroethyl isothiocyanate;
2,4-dinitrophenyl isothiocyanate;
ethylene diisothiocyanate;
p-iodophenyl isothiocyanate;
4-methylthiobutyl isothiocyanate;
p-phenylene diisothiocyanate;
2-pyridyl isothiocyanate;
p-(methylthio)phenyl isothiocyanate; and
9-phenanthryl isothiocyanate.

EXAMPLE 45

Copolymer of Chloral and Diphenyl Ketene

Part A

In a dry test tube (18 × 200 mm.), which was blanketed with nitrogen, a mixture of 15 g. of freshly distilled chloral and 1 g. of freshly distilled diphenylketene was heated in an oil bath to 65° C. A 1 molar solution of lithium tert-butoxide in cyclohexane (0.2 ml.) was then added and the mixture stirred, while still under nitrogen, to produce a uniform mixture. The threshold polymerization temperature of this mixture was 51° C. One part of the calm, initiated mixture was left in the test tube, and the tube was placed without agitation into a —40° C. bath. Polymerization in the unagitated mixture commenced almost immediately and was essentially complete in 1 hour. The tube containing the copolymer was taken out of the cooling bath and allowed to come to room temperature. The plug of chloral-diphenylketene copolymer was removed from the test tube.

Part B

The other part of the initiated comonomer mixture was transferred under nitrogen at temperatures above 65° C. to a mold formed by two glass plates separated by a strand of elastic fiber about 0.1 mm. thick. The assembly with its unagitated contents still under nitrogen was then placed in a bath at —40° C. and maintained in placid condition for about one hour. A clear film of chloral-diphenylketene copolymer was obtained which was stiff and tough. The film was washed with carbon tetrachloride and dried. The polymer was insoluble in all common organic solvents. Elemental analysis for C and H (TABLE II) indicated that the polymer contained 3.3 mole percent of diphenylketene. The infrared spectrum showed a strong band at 5.75 μ indicative of an ester linkage. The thermal stability of this sample was substantially improved over chloral homopolymer. The 5 percent weight loss temperature of the copolymer determined at a heating rate of 6° C./min. in nitrogen was 235° C. Typical samples of chloral homopolymer prepared by a similar process had 5 percent weight loss temperatures in the range of 85°–120° C.

EXAMPLE 46

Copolymer of Chloral and Butylethylketene

A copolymerization was carried out by the procedure of EXAMPLE 45 using butylethylketene as the comonomer. Components: 20 ml. of chloral, butylethylketene (10 ml. of a 20 percent solution in hexane), and lithium tert-butoxide (0.4 ml. of 1 molar cyclohexane solution). The film was clear, tough, and insoluble. The infrared spectrum of this copolymer showed a strong absorption band at 5.75μ indicative of an ester linkage. The 5 percent weight loss temperature was 153° C.

EXAMPLES 47 and 48

Copolymerizations of chloral were carried out with dimethylketene and pentamethyleneketene using the procedure of EXAMPLE 45 to produce films. These are tabulated in TABLE II together with EXAMPLES 45 and 46.

TABLE II.—COPOLYMERIZATION OF CHLORAL WITH KETENES

| Example | Chloral (g.) | Comomomer Type | Amount, (g.) | Molar feed ratio chloral/ketene | Iniator* (ml.) | Copolymer analysis (percent) C | H | Mol chloral in copolymer | Mechanical properties of films Tensile strength (p.s.i.) | Ultimate elongation, (percent) |
|---|---|---|---|---|---|---|---|---|---|---|
| 45 | 15 | Diphenylketene | 1 | 20 | 0.2 | 19.15–19.18 | 0.91–0.92 | 96.7 | 6,330 | 20.5 |
| 46 | 30 | Butylethylketene | 2 | 12.5 | 0.4 | 16.82 | 0.82 | 99.0 | | |
| 47 | 30 | Dimethylketene | 1.2 | 12 | 0.4 | 17.23 | 1.14 | 98.0 | | |
| 48 | 30 | Pentamethyleneketene | 0.8 | 28 | 0.4 | 17.17 | 1.04 | 98.0 | | |

*Lithium tert-butoxide (1 molar) in cyclohexane.

EXAMPLE 49

Copolymer of Chloral and Dimethylketene

In a 50 ml. glass polymerization tube was placed a sealed vial containing 0.2 ml. of a 2 molar solution of lithium tert-butoxide in cyclohexane and several steel balls. Chloral (30 g.) was added to the tube and dimethylketene (1.2 g.) was then condensed into the tube. The supernatant air in the tube was evacuated after which the tube was sealed and heated to 60° C. The tube was shaken vigorously to cause the steel balls to break the vial containing the initiator and to produce a homogeneous solution. After the contents of the tube had come to rest it was placed without agitation in a —30° C. bath. Polymerization commenced in the placid mixture almost immediately. The tube was taken out after an hour and the polymerization was allowed to go to completion overnight at room temperature. The initial yellow color of the solution almost completely disappeared during the polymerization. The tube was opened and a tough and stiff chloral-dimethylketene copolymer was obtained. Elemental analysis for carbon and hydrogen indicated the polymer contained 6 percent of dimethylketene, and the infrared spectrum of the polymer showed a strong ester band at 5.75 μ.

EXAMPLES 50 and 51

Copolymerizations of chloral were carried out with ketene and methylketene using the sealed tube procedure of EXAMPLE 49. Details of these are shown in TABLE III.

remove oxygen and any other dissolved gas present to minimize the formation of voids in the final product.

Rigid shaped objects can be produced with the catalyzed filler-monomer mixture such as flat, curved, corrugated or

TABLE III.—COPOLYMERIZATION OF CHLORAL WITH KETENES

| Example | Chloral (g.) | Comonomer Type | Amount, g. | Molar feed ratio chloral/ketene | Initiator* (ml.) | Copolymer Analysis (percent) C | H | Mol percent chloral in copolymer |
|---|---|---|---|---|---|---|---|---|
| 49 | 30 | Dimethylketene | 1.2 | 12 | 0.4 | 17.17 17.20 | 1.15 1.05 | 98.0 |
| 50 | 30 | Ketene | 1.0 | 8.5 | 0.4 | 16.95 | 0.88 | 95.2 |
| 51 | 30 | Methylketene | 1.2 | 9.5 | 0.4 | 16.92 16.91 | 1.05 1.08 | 96.1 |

*Lithium tert-butoxide (1 molar) in cyclohexane.

When the following ketenes are substituted for dimethylketene in the procedure of EXAMPLE 49, the corresponding chloral-ketene copolymers are obtained:
phenoxyketene;
p-chlorophenoxyketene;
2,4-dichlorophenoxyketene;
2,4,6-trichlorophenoxyketene;
diphenoxyketene;
bis(p-biphenylyl)ketene;
di-p-tolylketene;
dimesitylketene;
dodecylethylketene;
durylphenylketene;
tetradecylketene;
octadecylketene;
benzylmethylketene;
cyclohexylketene;
dimethyleneketene (carbonylcyclopropane);
tetramethyleneketene (carbonylcyclopentane);
(1-naphthyl)phenylketene;
3,3,3-trichloropropylketene;
p-methoxyphenylketene;
dicyanoketene (carbonylmalononitrile);
(ethoxycarbonyl)ketene;
and (ethoxycarbonyl)-p-tolylketene.

FILLED COMPOSITIONS

It has been pointed out above that the copolymers of this invention can be combined with fillers and reinforcing of all types whether inorganic or organic.

The chloral copolymer moiety of the filled compositions forms a matrix representing 1-99 percent by weight, of the total weight of the filled compositions and preferably 60-95 percent of the total weight of the filled compositions. When fiber fillers are used, such as especially treated glass fibers capable of chemical bond formation between the copolymer and glass fiber, tough rigid reinforced objects can be obtained. The filled chloral copolymer compositions, in general, possess a combination of mechanical and physical properties as follows: good weathering, high rigidity, non-burning, as they do not support combustion, and good tensile and impact strength. When a bond is formed between the matrix resin and the filler, an added property of good hydrolytic stability is obtained. Preferably, this bond should be a chemical bond such as that formed between the copolymer and glass treated with a vinylsilane or Werner-type chromate complex containing an addition polymerizable group. However, good properties are observed in filled compositions where the bond between the matrix copolymer and filler is other than a chemical bond such as a Van der Waals bond.

Filled compositions are prepared by mixing fillers with a catalyzed mixture of chloral and comonomers prior to cryotachensic polymerization. Alternatively, the filler can be mixed with the mixture of monomers, then after complete mixing, the desired quantity of initiator is added to the mixture, prior to cryotachensic polymerization. It is preferable to degas the catalyzed mixtures prior to polymerization to otherwise shaped sheets for glazing and architectural uses, automobile bodies, exterior step treads, boat hulls and decking, fishing poles, fire barriers, laundry tubs, electrical appliance housings, bearings, motor insulation, rocket motor casings and the like. The non-burning characteristics of the products of this invention make them particularly advantageous in these uses.

The mechanical properties of the reinforced copolymer panels compare very favorably with the mechanical properties of available fiber glass reinforced polyester compositions.

The chloral copolymer reinforced sheets are completely noncombustible whereas polyester panels burn vigorously and even so called flame retardant compositions support combustion when compared in the American Society for Testing and Materials (ASTM) flammability test D635-63.

EXAMPLE 52

Copolymer of Chloral and p-Phenyl Isocyanate Filled with Glass Wool

A layer of glass wool about 3 mm. thick, measuring about 220 mm. × 140 mm. and weighing about 15 g. was placed between two 3-mm. glass plates measuring 180 mm. × 280 mm. A length of 6-mm.× 1.5-mm.-wall -mm.-wal gum rubber tubing was inserted between the plates about 1 inch in from the edges to serve as a gasket which was liquid tight except for a small opening near one corner through which the polymerizable monomer mixture can be introduced. The assembly was clamped together with spring clamps on all edges and heated to 60° C. A mixture of chloral (93.5 ml.) and p-chlorophenyl isocyanate (6.2 ml.) was heated under nitrogen to 68° C. and mixed with 4.0 ml. of a 1 molar solution of triphenyl phosphine in benzene. This initiated monomer mixture was transferred with a preheated (60° C.) hypodermic syringe having a large bore (12 ga) needle long enough to reach nearly to the bottom of the glass-filled mold. The preheated mold was carefully filled, from the bottom up in order to displace the air trapped in the glass, with the hot mixture of initiated monomer. With the polymerization mixture in quiescent condition, the filled mold was quickly immersed in ice water taking care to keep any water from getting into the casting through the opening in the gasket and to keep the polymerization mixture quiescent during the polymerization. After one hour the mold was removed from the ice bath and allowed to warm to room temperature overnight. One half (A) of the strong, hard, nearly transparent reinforced chloral/p-chlorophenyl isocyanate copolymer sheet was cured in a 100° C. air over. After 24 hours it had lost 22.2 percent in weight, but was essentially unchanged in length or width. The other half (B) of the sheet was allowed to air dry. It lost less than 3 percent in weight in one week.

EXAMPLES 53-80 which follow, show the preparation of chloral homopolymer and copolymer sheets reinforced with selected fibrous materials and prepared in the manner indicated. The detailed procedure of EXAMPLE 52 was used except for the differences shown.

TABLE IV

| Example | Fibrous reinforcing agent Material | G. | Monomer charge Chloral ml. | Comonomer ml. | Initiator ml. | Work-up procedure | Tensile strength (p.s.i.) | Elongation (percent) | Flexural modulus (p.s.i.) | Flexural strength (p.s.i.) | Notched Izod impact strength (ft. lbs./in.) | Remarks |
|---|---|---|---|---|---|---|---|---|---|---|---|---|
| 53 | Glass wool (as in Ex. 52) | 26.2 | 93.5 | 6.2A | 4.0B | Under vacuum for 2 days | 5,930 | 5 | 229,000 | | 1.58 | Strong, hard sheet of reinforced chloral/p-chlorophenyl isocyanate copolymer. |
| 54 | Polypivalolactone[1] | 15 | 93.5 | 6.2A | 4.0B | Air dry | 3,730 | 24.0 | | | 3.82 | Strong, hard reinforced copolymer sheet. |
| 55 | Polyethylene (terephthalate)[2] | 4.5 | 93.5 | 6.2A | 4.0B | 100° C., 168 hrs | | | | | 3.94 | Do. |
| | | | | | | Air dry | | | | | 1.31 | Do. |
| 56 | Polypropylene[3] | 12.0 | 93.5 | 6.2A | 4.0B | do | | | | | 4.81 | Do. |
| 57 | Fiber glass[4] | 35.0 | 93.5 | 6.2A | 4.0B | 100° C., 169 hrs | 12,580 | 2.5 | 571,000 | 16,600 | 12.2 | Do. |
| | | | | | | Air dry | | | | 12,800 | 11.7 | Do. |
| 58 | Fiber glass[5] | 35.0 | 93.5 | 6.2A | 4.0B | 100° C., 169 hrs | 11,500 | 3.2 | | | 12.9 | Do. |
| | | | | | | 120° C., 1 hr | 12,720 | 2.5 | 453,000 | | 11.8 | Do. |
| 59 | Fiber glass[6] | 27.3 | 140.3 | 10.5C | 6.0B | do | 13,800 | 2.0 | 576,000 | 20,000 | 11.7 | Strong, hard sheet of reinforced chloral/phenyl isocyanate copolymer. |
| 60 | Fiber glass[7] | 28.2 | 140.3 | 9.3A | 6.0B | do | 5,900 | 2 | 300,000 | 10,000 | 17.7 | Strong, hard sheet of reinforced copolymer sheet. |
| 61 | do[7] | 8.3 | 140.3 | 9.3A | 6.0B | do | 6,190 | | 362,000 | 9,910 | 9.4 | 8.3 vol. percent glass. |
| 62 | Fiber glass[6] | 20.6 | 140.3 | 9.3A | 6.0B | do | 9,560 | | 464,000 | 14,200 | 7.9 | 10.6 vol. percent glass. |
| 63 | do[6] | 50.0 | 140.3 | 9.3A | 6.0B | do | 12,580 | | 503,000 | 16,200 | 10.4 | 11.7 vol. percent glass. |
| 64 | do[6] | 39.4 | 140.3 | 9.3A | 6.0B | do | 11,300 | | 539,000 | 14,100 | 13.5 | 21.3 vol. percent glass. |
| 65 | do[6] | 51.6 | 140.3 | 9.3A | 6.0B | do | 16,600 | | 752,000 | 19,700 | 16.2 | 45.2 vol. percent glass. |
| 66 | do[6] | 26.8 | 140 | 8.25I | 6.0B | do | 8,880 | | 574,000 | 16,400 | 9.2 | Strong, hard sheet of reinforced chloral/diphenyl ketene copolymer. |
| 67 | do[6] | 26.7 | 140 | 10.5E | 6.0B | do | 5,410 | | 718,000 | 15,000 | 11.5 | Strong, hard sheet of reinforced chloral/toluene diisocyanate copolymer, 5 mole percent toluene diisocyanate. |
| 68 | do[6] | 28.5 | 140 | 10.5F | 6.0B | do | 9,810 | | 595,000 | 18,900 | 11.8 | Strong, hard sheet of reinforced chloral/hexamethylene diisocyanate copolymer. |
| 69 | do[6] | 27.4 | 140 | 12.0G | 6.0B | do | 11,100 | | | | 14.6 | Strong, hard sheet of reinforced chloral/p,p'-diisocyanatodiphenylmethane copolymer. |
| 70 | do[6] | 25.9 | 140 | 14.25H | 6.0B | do | 10,600 | | 643,000 | 18,200 | 9.8 | Strong, hard sheet of reinforced polychloral. |
| 71 | do[6] | 27.7 | 140 | 9.1I | 6.0B | do | 5,350 | | 532,000 | 13,100 | 11.2 | Strong, hard sheet of reinforced chloral/2,5-dichlorophenyl isocyanate copolymer. |
| 72 | do[6] | 28.4 | 140 | None | 6.0B | do | 7,190 | | 652,000 | 15,900 | 9.9 | Strong, hard sheet of reinforced polychloral. |
| 73 | do[6] | 28.3 | 140 | 4.6P | 6.0B | do | 9,930 | | 476,000 | 12,000 | 10.4 | 2 mole percent toluene diisocyanate. |
| 74 | do[6] | 28.2 | 135 | 24.0P | 6.0B | do | 7,310 | | 539,000 | 10,400 | 11.1 | 10 mole percent toluene diisocyanate. |
| 75 | do[6] | 27.0 | 117 | 1.8A | 6.0B | do | 11,100 | 3.3 | 487,000 | 13,500 | 10.6 | 1 mole percent p-chlorophenyl isocyanate. |
| 76 | do[6] | 26.6 | 113 | 5.6A | 6.0B | do | 8,990 | 3.1 | 470,000 | 13,100 | 9.9 | 3 mole percent p-chlorophenyl isocyanate. |
| 77 | do[6] | 26.6 | 140 | 11.0A | 6.0B | do | 5,000 | 3.8 | 517,000 | 15,200 | 10.5 | 6 mole percent p-chlorophenyl isocyanate. |
| 78 | do[6] | 25.2 | 137 | 16.5A | 6.0B | do | 7,660 | 2.6 | 487,000 | 14,600 | 13.2 | 8 mole percent p-chlorophenyl isocyanate. |
| 79 | do[6] | 25.6 | 130 | 24.0A | 6.0B | do | 4,580 | 2.7 | 314,000 | 12,900 | 10.8 | 12 mole percent p-chlorophenyl isocyanate. |
| 80 | do[6] | 27.8 | 126 | 30.0A | 6.0B | do | 8,570 | 3.4 | 385,000 | 11,200 | 12.9 | 15 mole percent p-chlorophenyl isocyanate. |

[1] Bat of fibers having strengths of 1.5 grams per denier, prepared from polypivalolactone fibers of U.S. Patent 2,968,055.
[2] Bat of fibers.
[3] Random fibers in bat form.
[4] Chopped glass fiber reinforcing bat treated with a silane.
[5] Washed with chloroform and vacuum dried before use.
[6] Washed with acetone and dried before use.
[7] Continuous fiber reinforcing bat treated with a silane, washed with chloroform and dried before use.

A = p-Chlorophenyl isocyanate.
B = 1-molar triphenylphosphine in benzene.
C = 2,4-toluene diisocyanate.
D = Phenyl isocyanate.
E = Diphenyl ketene.
F = 80% 2,4-toluene diisocyanate, 20% 2,6-toluene diisocyanate.
G = Hexamethylene diisocyanate.
H = p,p'-Diisocyanatodiphenylmethane.
I = 2,5-dichlorophenyl isocyanate.

EXAMPLE 81

A. Fabric-Reinforced Pipe of Chloral Polymers

The bottom third of each of a series of 18 mm. outside diameter (OD) test tubes was wrapped with 50 mm. wide strips of various fabrics until the wrapped test tube would just comfortably fit inside a test tube of 26 mm. inside diameter (ID). The coaxially assembled tubes were held under vacuum at 70° C. to remove any traces of moisture and the free space between the heated test tubes was filled with chloral monomer heated to 68° C. to which had been added 0.1 mole percent of lithium tert-butoxide. The polymerization mixtures were allowed to become placid and the filled assemblies were then chilled to 0° C. for periods of time ranging from 20 min. to 16 hours without agitating the polymerization mixtures. After the assemblies had warmed to room temperature, the test tubes were broken away to leave short lengths of fabric reinforced cylinders of strong, hard polychloral about 2 inches long, 18 mm. ID, and 26 mm. OD. Cylinders reinforced with woven fiberglass cloth, woven polytetrafluoroethylene fabric, fiberglass filter cloth, and nonwoven felts of polypivalolactone and polypropylene were prepared. Similarly strong reinforced tubes of chloral copolymers are obtained when the chloral/-p-chlorophenyl isocyanate/triphenylphosphine mixture of EXAMPLE 52 is used in place of the chloral/lithium tert-butoxide mixture above.

B. Non-Reinforced Pipe of Chloral-Phenyl Isocyanate Copolymers.

An open-ended glass tube about 300 mm. long and 75 mm. inside diameter was fitted with a rubber stopper at each end, each stopper having a central opening. A second, smaller glass tube about 300 mm. long but with an outside diameter of 45 mm. was positioned coaxially within the larger tube by insertion through the central openings in the rubber stoppers, and the assembly mounted vertically. The smaller inner tube was closed at its bottom end with a solid rubber stopper. The upper stopper of the outer tube was additionally provided with two smaller holes opening into the bore of the outer tube, one to admit nitrogen gas and the other, itself loosely stoppered, to admit monomer and initiator into the bore of the outer tube. Hot (65° C.) water was circulated through the smaller tube and a 65° C. water bath raised around the outer one. A mixture of chloral (625 ml.) and phenyl isocyanate (29 ml., 4 mole percent) was heated to 65° C., mixed with 33 ml. of 3.2% lithium tertbutoxide in cyclohexane and used to fill the annular space between the concentric tubes and the resulting homogeneous mixture allowed to become motionless. Circulation of the hot water in the inner tube was continued but the hot water bath surrounding the outer tube was removed. A −20° C. cooling bath was then raised around the outer tube at the rate of 3 mm. per minute until the cooling bath reached the top level of the quiescent polymerization mixture and completely surrounded it. Cooling of the outer tube was continued for 30 minutes while the inner tube was still being kept warm. After 30 minutes of standing under these conditions, the flow of hot water into the inner tube was stopped and the hot water in the tube was removed by suction, the cooling bath still being in position around the outer tube. After another 30 minute period the stopper closing the bottom end of the inner tube was removed thus allowing the −20° C. bath liquid to enter and fill the center tube. After 30 minutes of thus cooling both the inside and outside tubes, the cold bath was removed and the resulting copolymer product allowed to warm to room temperature overnight before the glass was broken away. The resulting pipe section was void-free and had a smooth outer surface. The inner surface was relatively rough and uneven. Since the manner of cooling caused polymerization to occur from the outer wall inward, the shrinkage which occurred during polymerization caused the polymer to shrink away from the inner tube. The inner surface was machined smooth to give a strong pipe about 200 mm. long, 75 mm. OD, and 50 mm. ID.

EXAMPLE 82

Chloral, p-Chlorophenyl Isocyanate, Diphenylketene Terpolymer

In a dry 250 ml. glass flask which was continuously blanketed with nitrogen, there was mixed 140 ml. of freshly distilled chloral, 9.3 ml. of p-chlorophenyl isocyanate and 1.5 ml. of diphenylketene. The mixture was heated to 65° C. and 6.0 ml. of a 1 molar solution of triphenylphosphine in benzene was added and mixed in well to form a uniform mixture. The initiator-containing mixture was transferred at temperatures above 60° C. to a mold formed of two glass plates separated by a 3 mm. gum-rubber gasket and the mixture allowed to become motionless. The assembly was cooled at 0° C. to bring about polymerizition of the motionless mixture. The mold was opened after polymerization had been completed to release a clear, tough 3-mm.-thick sheet of chloral/p-chlorophenyl isocyanate/-diphenylketene terpolymer useful for glazing.

EXAMPLE 83

A. Chloral, p-Chlorophenyl Isocyanate, Dodecyl Isocyanate Terpolymer

The procedure of Example 82 was repeated, using a mixture of 140 ml. chloral, 7 ml. p-chlorophenyl isocyanate, 2 ml. dodecyl isocyanate and 6.0 ml. of a 1 molar solution of triphenylphosphine in benzene. A tough, clear sheet of chloral/p-chlorophenyl isocyanate/dodecyl isocyanate terpolymer was obtained.

B. Chloral,p-Chlorophenyl Isocyanate, Hexyl Isocyanate Terpolymer

The procedure of Example 82 was repeated using a mixture of 140 ml. chloral, 7 ml. p-chlorophenyl isocyanate, 2 ml. hexyl isocyanate and 6.0 ml. of 1 molar solution of triphenylphosphine in benzene. A tough, clear sheet of chloral/p-chlorophenyl isocyanate/hexyl isocyanate terpolymer was obtained.

EXAMPLE 84

Chloral, Diphenylketene, 3,4-Dibromophenyl Isocyanate, Hexa-methylene Diisocyanate Tetrapolymer

Part A

In a dry 500-ml. Erlenmeyer flask, which was blanketed with nitrogen, a mixture of 210 g. (1.40 moles, 93.6 mole percent) of freshly distilled chloral, 9.2 g. (0.05 mole, 3.1 mole percent) of diphenyl ketene, 8.3 g. (0.03 mole, 2.0 mole percent) of 3,4-dibromophenyl isocyanate and 3.3 g. (0.02 mole, 1.3 mole percent) of hexamethylene diisocyanate was heated to 55° C. A 1-molar solution of triphenyl phosphine in benzene (6.0 ml.) was then added and mixed in well to form a homogeneous solution. One part of this heated mixture was transferred into a warm test tube, and the tube was then cooled to 0° C. without agitation. Polymerization commenced almost immediately and was essentially completed in one hour to form a tetrapolymer. The tube containing the tetrapolymer was then allowed to come to room temperature. The plug of chloral/diphenyl ketene/3,4-dibromophenyl isocyanate/hexamethylene diisocyanate tetrapolymer was then removed from the test tube, extracted for 50 hours with acetone, dried for 20 hours at 60° C./1 mm. and analyzed: C, 19.41; H, 1,00; N, 0.27; Br, 2.75; and Cl, 66.66. This corresponds to a chloral/diphenyl ketene/3,4-dibromophenyl isocyanate/hexamethylene diisocyanate molar ratio of 95/1.5/2.5/1.0 for which the calculated analysis is C, 18.73; H, 0.83; N, 0.41; Br, 2.60; Cl, 66.67.

Part B

Another part of the above heated initiated mixture of monomers as prepared in Part A was transferred at temperatures above 55° C. to a mold formed by two glass plates separated by a strand of elastic fiber about 0.1 mm. thick. The assembly and its quiescent contents was then cooled to 0° C. without agitation and kept at that temperature for about 1 hour. A clear film of chloral/diphenyl ketene/3,4-dibromophenyl isocyanate/hexamethylene diisocyanate tetrapolymer was obtained which was stiff and tough. The composition was the same as the product in Part A above. The infrared spectrum of the film showed a strong band at 5.70 $\mu$ indicative of a urethane linkage and a weaker, well separated band at 5.85 $\mu$ indicative of an ester linkage.

Part C

Another part of the above described, heated initiated mixture of monomers as prepared in Part A was transferred at temperatures above 55° C. to a mold formed by two glass plates separated by rubber tubing to make 3-mm.-thick sheets. The assembly and its quiescent contents was then cooled to 0° C. without agitation and kept at that temperature for about 1 hour. A clear sheet of chloral/diphenyl ketene/3,4-dibromophenyl isocyanate/hexamethylene diisocyanate was obtained which was stiff and tough. It was extracted with acetone as described in Part A. Elemental analysis for C, H, N, and Br, (C, 18.99; H, 0.98; N, 0.26; Br 2.29 Cl, 67.21) indicated the chloral polymer contained 95 mole percent of chloral, 1.5 mole percent of diphenyl ketene, 2.5 mole percent of 3,4-dibromophenyl isocyanate, and 1.0 mole percent of hexamethylene diisocyanate. The infrared spectrum (Nujol mull) showed a strong band at 5.70 $\mu$ indicative of a urethane linkage, and a weaker, well separated band at 5.85 $\mu$ indicative of an ester linkage.

EXAMPLE 85

Chloral-Phenyl Isocyanate Copolymer Filled With Carbon Black

An initiated monomer solution was prepared by mixing 50 ml. of chloral, 150 ml. of toluene and 0.12 g. of lithium tert-butoxide at 30° C. To 25 ml. of this solution in a 125 ml. Erlenmyer flask closed with a rubber stopper was added 0.2 g. of carbon black. The flask was shaken quickly to disperse the carbon black and when uniform and quiescent, the mixture was placed in an ice bath and held there until the chloral monomer gelled. Polymerization was completed by cooling to 5° C. for 12 hours. Residual solvent was removed at 0.2 mm. pressure. The polymer plug obtained was soaked with a 20% phenylisocyanate solution in toluene for a time sufficient to allow formation of a copolymer of chloral and phenylisocyanate. The sample was washed and dried to give a shiny black block of polymer which was machined into a flat chip about 4 mm. thick and 33 mm. in diameter.

EXAMPLE 86

A. Chloral,p-Chlorophenyl Isocyanate Copolymer With Phthalocyanine Blue Pigment

An experiment similar to Example 85 was carried out with copper phthalocyanine blue pigment instead of carbon black. Copper phthalocyanine blue (0.025 g.) was dispersed in the above initiated chloral mixture (40 ml.) and polymerization was carried out as described above to give a copolymer plug having a deep blue color.

B. Chloral, p-Chlorophenyl Isocyanate Copolymer With PolyTetrafluoroethylene Flock as Filler An experiment similar to Example 85 was carried out with fluorocarbon polymer flock instead of carbon black. 10 grams of chopped fibers of polytetrafluoroethylene were suspended in 60 ml. of the above initiated chloral mixture and polymerization carried out as described above under Example 85. A flock filled copolymer was obtained.

EXAMPLE 87

Pigmented Chloral, p-Chlorophenyl Isocyanate Copolymers

To a mixture of 10 ml. of chloral and 0.6 ml. of p-chlorophenylisocyanate was added at 60° C. a one molar benzene solution of triphenylphosphine (0.4 ml.) and 0.025 g. or 0.050 g. of the following pigments in separate experiments: Polychloro copper phthalocyanine, copper phthalocyanine blue, beta quinacridone, gamma quinacridone, coated lead chromate pigment, (U.S. Pat. No. 2,885,366), coated molybdate orange pigment (U.S. Pat. No. 2,885,366), and nickel azo complex.

The uniform, quiescent mixtures were placed in an ice bath for 2 hours and then allowed to stand for 16 hours at room temperature. The polymerization was accomplished smoothly and gave polymer pieces which lost approximately 10 percent weight upon heating for 1 hour at 120° C. The pieces did not change color during the heat treatment.

EXAMPLE 88

Chloral, p-Chlorophenyl Isocyanate Copolymer Filled with Titanium Dioxide

To a mixture of chloral (140 ml.) and p-chlorophenylisocyanate (9.3 ml.), at 50° was added a one molar benzene solution of triphenylphosphine (6 ml.) and finely divided TiO$_2$ (4 g.). This mixture was placed between glass plates held apart with a 3-mm. rubber spacer.

The assembly and its quiescent contents was placed in an ice bath for 1 hour and then held for 16 hours at room temperature for completion of the polymerization. The pigmented polymer sheet was heat treated for 1 hour at 120° C. The weight loss was 19 percent to give a white, opaque sheet.

For each of the following dyed copolymer preparations listed in Table V, the following polymerization mixture was used: chloral (70 ml.), p-chlorophenylisocyanate (4.2 ml.) and a one molar benzene solution of triphenylphosphine (2.8 ml.). To the mixture heated at 50° C., a dye (type and amount as shown in Table V) was added, and the homogeneous solution was placed in a cell formed formed by glass plates held apart by a 3-mm. polyvinyl chloride spacer. Polymerization was carried out by placing the assembly and its motionless polymerization mixture in an ice bath at 0° C. for 2 hours, and then held at room temperature for 16 hours. Colored copolymer sheets having a thickness of 3 mm. and good color stability, even after heat treatment for 1 hour at 120° C. (weight loss 8–14 percent), were obtained.

TABLE V

| Example | Dye | Amount (g.) |
| --- | --- | --- |
| 89 | (anthraquinone structure with O, NH$_2$, —O—phenyl, OH substituents) | 0.06 |

TABLE V—Continued

| Example | Dye | Amount (g.) |
|---|---|---|
| 90 | 1-hydroxy-4-anilino-anthraquinone structure | 0.01 |
| 91 | 1,4-diamino-2,3-diphenoxy-anthraquinone structure | 0.03 |
| 92 | $O_2N-C_6H_4-N=N-C_6H_4-N(CH_3)-CH_2CH_2CN$ | 0.2 |
| 93 | 1-amino-2-bromo-4-hydroxy-anthraquinone structure | 0.1 |
| 94 | 3-hydroxy-2-(phthalimidomethyl)quinoline structure | 0.15 |
| 95 | 1,8-dihydroxy-4-nitro-5-anilino-anthraquinone structure | 0.005 |

The unpolymerized liquid mixtures of chloral and the comonomers described above and these liquids containing a polymerization catalyst, aprotic solvent or filler form another embodiment of the invention. The concentration of chloral, comonomers, catalysts, aprotic solvents, fillers, etc., are as described above. The liquid mixtures of chloral and comonomers without initiator can conveniently be stored and shipped prior to polymerization since they do not undergo polymerization in the absence of a polymerization initiator. The unpolymerized liquid mixtures containing a catalyst may be stored and shipped if they are maintained above the threshold polymerization temperature of the particular liquid. It should be understood, however, that storage times may vary from one composition to another, some being storable and shippable for longer periods of time than others. These liquid mixtures can be heated in a range whose lower limit is above their threshold temperature and whose upper limit is below their reflux temperature. However the temperature should not exceed the decomposition temperature of any of the ingredients of said liquid mixtures. Fillers can be added to the mixtures of monomers maintained above the threshold temperature. The filler-comonomer mixtures are in the form of a paste having a dough-like consistency which can be fabricated into shaped objects by matched-die molding coupled with cooling the mixture below the threshold temperature.

The conversion of comonomers to polymer may be made over wide ranges of polymerization conditions.

EXAMPLE 96

Chloral, p-Chlorophenyl Isocyanate Copolymer Sheets

To a mixture of 140 ml. of chloral and 9.3 ml. of p-chlorophenyl isocyanate at 50° C. was added 6.0 ml. of a 1 M solution of triphenylphosphine in benzene. The resulting uniform mixture was used to fill 3-mm. clear sheet molds (described in Example 82). The molds containing the quiescent polymerization mixtures were then polymerized under a variety of conditions of time and temperature. The resultant polymerized sheets were then weighed, baked one hour at 120° C. and then extracted for 24 hours in acetone, dried in vacuo at 60° C. and reweighed. Conversion of the monomers (1) to polymer stable at 120° C. and (2) to polymer stable to acetone extraction was calculated.

| Ex. No. | Polymerization conditions | % Conversion (1) | (2) |
|---|---|---|---|
| A | 1 hr. at 35° C., 16 hrs. at *r.t. | 77.4 | 57.3 |
| B | 1 hr. at 0° C., 16 hrs. at r.t. | 88.5 | 69.8 |
| C | 5 min. at 0° C., 16 hrs. at r.t. | 86.6 | 69.4 |
| D | 16 hrs. at 0° C. | 89.6 | 73.8 |
| E | 1 hr. at 0° C. | 85.8 | 66.8 |
| F | 1 hr. at −50° C., 16 hrs. at r.t. | 82.3 | 60.6 |

* room temperature

STABILIZATION OF POLYMERS BY HEAT TREATMENT

It has been mentioned earlier that solvent and unpolymerized monomers may be removed from the copolymers of this invention by evaporation or extraction. Such treatment results in polymer of enhanced thermal stability.

The polymers may also be stabilized against thermal degradation by, surprisingly enough, a heat treatment at a temperature range of 80° to 175° C. for a period of time ranging from 5 minutes up to several hours. It is believed that the raw polymers contain stable polymer, an "unstable" fraction, and unchanged monomers and solvent. In order to prepare polymers having enhanced usefulness, particularly for extended use at elevated temperatures, the solvent and unchanged monomers should be removed and more importantly the less stable portion present in the polymer should be altered or removed. The heat treatment appears to remove the solvent and unchanged monomers and also results in an enhancement of the thermal stability of the polymer.

This is a most surprising phenomenon since other raw polymers, not previously treated for heat stability, such as polyvinyl chloride and polyoxymethylene decompose autocatalytically when heated and become less stable rather than more stable to heat. Samples of the copolymers of this invention that lost weight rapidly at first, 6 percent in the first 100 hours at 100° C., became essentially weight-stable, only 0.7 percent loss per week, after being heated at 100° C. for 600 hours.

EXAMPLE 97

A. Copolymer of Chloral and p-Chlorophenyl Isocyanate

A clear sheet 3-mm.-thick of 95/5 mole ratio chloral/p-chlorophenyl isocyanate, prepared according to Example 52 but omitting the glass wool, was cut into four pieces. Piece I was not treated further. Pieces II, III, and IV were baked in a 120° C. air oven for 1, 2 and 6 hrs., respectively. The relative thermal stability of the four pieces at 60° was then determined by measuring the further loss in weight after 225 hrs. at 60°. I lost 18.8 percent while II, III and IV lost only 1.5, 0.3 and 0.1 percent respectively.

B. Copolymer of Chloral and Toluene Diisocyanate

A sheet like that in A was made substituting toluene diisocyanate for the p-chlorophenyl isocyanate to give a 95/5 mole ratio copolymer of chloral/toluene diisocyanate. The sheet was cut into four pieces. Piece I was not further treated. Pieces II, III and IV were baked at 120° C. for 1, 2 and 6 hours, respectively as in A. On aging at 60° C. for 225 hrs. I lost 14.6 percent while II, III, and IV lost only 0.2, 0.2 and 0.0 percent, respectively.

STABILIZATION OF POLYMERS BY SOLVENT EXTRACTION

The copolymers resulting from the cryotachensic copolymerization process can be processed in various ways in order to remove any last traces of unpolymerized monomers. For some purposes it is sufficient merely to allow the polymerized piece to air dry whereupon the unpolymerized material spontaneously evaporates. This is illustrated for example in Examples 41 and 42. The unchanged monomers are removed somewhat more rapidly by holding the polymerized piece under reduced pressure for a period as in Examples 2 or 53. Even more effective in removal of unchanged monomers as well as initiator residues is the process of washing or exhaustively extracting the polymer with a liquid in which the monomers are soluble but the polymer insoluble. In the case of those polymers of the present application which contain at least about 80 mol percent chloral, the choice of solvent for such an extractive procedure is quite wide since the monomers employed are generally soluble in organic liquids while the polymers are not. Unchanged chloral can be removed from the polymer with water. Such extractive procedures are illustrated in Examples 2 and 45 B.

Washing or exhaustive extraction of the copolymers of the present application with liquid is as stated above very effective in removal of unchanged monomer but in addition washing or exhaustive extraction with certain selective solvents results in products of enhanced thermal stability and resistance to discoloration on exposure to light. Such improvements are especially desirable in end uses which involve exposure to elevated temperatures or in glazing applications where clear sheets having prolonged freedom from color development are important.

It is believed that the solvents which are especially effective in enhancing thermal stability actually do more than remove unchanged monomers and initiator residue and are in fact effective in eliminating certain thermally unstable polymer fractions from some polymer preparations. As can be seen from the examples given below solvents such as acetone or methanol for example which give polymer of enhanced thermal stability, do in fact bring about weight losses much greater than other solvents such as water or carbon tetrachloride, which do not markedly enhance thermal stability.

EXAMPLE 98

Copolymer of Chloral and p-Chlorophenyl Isocyanate

Transparent clear sheets 3-mm.-thick were prepared by the general procedure of Example 52 but no glass wool was used between the plates. The monomer mixture consisted of 140 ml. of chloral and 9.3 ml. of p-chlorophenyl isocyanate. It was heated to 52° C. and 6.0 ml. of a 1-molar solution of triphenyl phosphine in benzene was added. The polymerization was effected by cooling the uniform, quiescent polymerization mixture at 0° C. for 1 hour. After standing overnight the resultant sheets were baked for 1 hour at 120° C. and lost about 12 percent in weight to give clear transparent panels essentially free of unpolymerized chloral. The sheets were cut into strips 12.5 mm. wide and about 6 inches long. Each piece was weighed, placed in about 50 ml. of solvent, allowed to stand at room temperature or at 60° C. for 8 hrs., dried in vacuo at 50° C. and reweighed. This extraction procedure was repeated with fresh solvent each time for eight cycles until the weight loss, expressed as percent of the original weight, was constant. As a measure of thermal stability the percent of weight loss on holding the extracted piece in a circulating air oven at 200° C. was then measured.

| Example Number | Extractant | Extraction temp., °C. | Percent lost on extraction | Thermal stability, percent lost in 4 hrs. at 200° |
|---|---|---|---|---|
| A | None | | | 34.2 |
| B | Water | *60 | 2.0 | 27.1 |
| | | | 2.4 | 35.2 |
| C | CCl₄ | *60 | 2.5 | 20.5 |
| | | | 2.7 | 21.8 |
| D | CHCl₃ | *60 | 12.4 | 3.9 |
| | | | 12.5 | 3.3 |
| E | Benzene | *60 | 14.1 | 7.3 |
| | | | 15.3 | 3.5 |
| F | Pentane | 60 | 14.3 | 11.7 |
| G | 2-butanone | 60 | 18.4 | 3.1 |
| | | | 18.6 | 2.0 |
| H | CH₂Cl₂ | 60 | 17.9 | 1.0 |
| I | Acetone | 60 | 18.5 | 4.6 |
| | | | 19.3 | 1.5 |

* Room temperature.

Improvement in color retention on outdoor exposure after solvent extraction can be seen if pieces like A above (or equivalent sheets which have been baked for 1 hr. at 120° C.) are placed on outdoor exposure in Arizona along with a solvent-extracted sample like I above. I will remain essentially color-less while A will become increasingly yellow, amber and finally red-brown.

Other effective solvents include acrylonitrile, toluene, acetonitrile, acetic acid, acetic anhydride, methyl ethyl ketone, pentane, methylene chloride, ethyl acetate, trichloroethylene, tetrahydrofuran, diethyl maleate and trimethyl borate.

STABILIZATION OF POLYMERS WITH ULTRAVIOLET LIGHT SCREENING AGENTS

The polymers of the invention can be protected against discoloration by ultraviolet irradiation by the incorporation of ultra violet screening agents. These agents can be incorporated after the polymerization process has been carried out or by adding the agent directly into the monomer mixture before polymerization is effected.

Incorporation of such screening agents or light stabilizers into the formed polymer can be accomplished by soaking the polymer in the light stabilizer or a 0.1–20 percent solution thereof in an organic solvent.

EXAMPLE 99

Copolymer of Chloral and p-Chlorophenyl Isocyanate

An acetone-extracted sample of 95/5 chloral-p-chlorophenyl isocyanate copolymer was allowed to soak in a 2% acetone solution of ethyl 2-cyano-3,3-diphenyl acrylate ($Ph_2C$ $C(CN)COOEt$) for 16 hours, blotted dry, heat-treated for 4 hours at 120° C., and given a 30-day weather test under accelerated conditions in Arizona. No color formation was noted after the exposure. A simultaneously exposed control sample without the light stabilizer was brown after exposure.

EXAMPLE 100

Copolymer of Chloral and p-Chlorophenyl Isocyanate

A clear sheet 3-mm.-thick of 95/5 mole ratio chloral/p-chlorophenyl isocyanate copolymer like that of EXAMPLE 52 was baked 1 hr. at 120°C. and cut into strips one-half inch wide and 5 inches long. Three pieces were soaked in a 2 percent solution of (a) 2(2'-hydroxy-3',5'-ditertbutylphenyl)benzotriazole available from Geigy Chem. Corp. of Ardsley, N.Y., as Tinuvin 327, (b) ethyl 2-cyano-3,3-diphenyl acrylate available from General Aniline and Film Corp., New York, N.Y. as Uvinul N-35 and (c) 2,2'-dihydroxy-4,4'-dimethoxy benzophenone also available from General Aniline and Film Corp as Uvinul D–49. A fourth piece (d) was left untreated. On outdoor exposure (d) turned quite dark while (a), (b) and (c) remained nearly colorless.

In addition to the specific benzophenone, benzotriazole and substituted acrylate type ultra violet screens, shown above, other members of these three types may be used. Examples which might be mentioned are 2-hydroxy-4-methoxy benzophenone, 2-(2'-hydroxy-5-methylphenyl) benzotrizole and 2-hydroxy-4-(2-hydroxy-3-methylacryloxy)propoxybenzophenone. Other types of light stabilizers are listed in Modern Plastics Encyc. and include methyl salicylate, phenyl salicylate and resorcinol monobenzoate.

IMPROVED CONVERSION OF MONOMER TO POLYMER

The use of an aprotic liquid has been disclosed above as an aid in dispersing or dissolving the initiator in the chloral. Often the liquid is additionally useful in providing enough shrinkage of the polymerized piece to permit its ready removal from the mold in which the polymerization process was carried out.

It has been further found that the use of certain aprotic liquids enhance the conversion of the comonomers to the copolymers, an effect which has also been observed in the homopolymerization of chloral. High conversion of stable polychloral and chloral copolymers is attained by carrying out the copolymerization in the presence of up to 95 vol. percent of an inert aprotic diluent. These inert diluents are hydrocarbons such as pentane, hexane, cyclohexane, heptane, Nujol (liquid paraffinic hydrocarbons), toluene, xylene, etc; halocarbons such as carbon tetrachloride, trichloroethylene, tetrachloroethylene, 1,1,1-trifluorododecane, trichlorotrifluoroethane, chlorinated biphenyls (Arochlor), etc.; and ethers which are free of protonic hydrogen or groups other than ether oxygen, chlorine or fluorine, such as diethyl ether, dipropyl ether, dibutyl ether, diphenyl ether, tetrahydrofuran and the like.

EXAMPLE 101

Chloral, p-Chlorophenyl Isocyanate Copolymer

Chloral/p-chlorophenyl isocyanate monomer mixture, 95/5 mole ratio (10 ml.), was diluted with 2 ml. of the solvent indicated and heated to 48° C. a temperature which is in excess of the threshold temperature. Initiator (0.4 ml. of 1 molar triphenylphosphine in benzene) was added. The resulting homogeneous mixture was allowed to become quiescent, cooled without agitation to 0° C. and held at that temperature for 1.5 hours. After standing overnight at room temperature, the polymerized plugs were weighed, baked 1 hour at 120° C. to remove the diluent and the unchanged monomer, reweighed and the conversion of monomer to polymer ("-treated at 120° C.") calculated. Without the diluent present the conversion of monomer to polymer was 87–89 percent. The presence of 20 vol. percent of diluent, based on chloral, enhances the conversion of polymer up to as much as 97 percent.

| No. | Diluent | vol.% | wt.% | % conversion |
|---|---|---|---|---|
| A | benzene | 20 | 10.6 | 94.8 |
| B | cyclohexane | 20 | 9.4 | 97.1 |
| C | diethyl ether | 20 | 8.6 | 93.8 |
| D | pentane | 20 | 7.6 | 94.3 |

EXAMPLE 102

Chloral, p-Chlorophenyl Isocyanate Copolymer

Plate molds 3-mm.-thick (as described in Example 82) were heated to 45° C. and filled with a 40° C. mixture of 100 ml. of chloral and 6 ml. of p-chlorophenyl isocyanate in inert diluent as indicated below and 4 ml. of 1-molar triphenylphosphine in benzene. The filled plates and their quiescent mixtures were held at 0° C. for 1.5 hours and then overnight at room temperature. The sheets were removed, weighed, baked 4 hours at 100° C., reweighed and the conversion of monomers to polymer calculated.

| | | | Percent conversion of comonomers to polymer after— | |
|---|---|---|---|---|
| Example Number | Diluent (ml. added) | Wt. percent diluent[1] in mixture | 4 hrs. at 120° C. | 1 hr. at 120° C. followed by acetone extraction |
| A | None | 1.8 | 84.0 | |
| B | Cyclohexane (51) | 21.8 | 97.7 | |
| C | Benzene (45) | 21.8 | 96.7 | |
| D | Hexane (12.5) | 6.8 | 91.6 | |
| E | Hexane (21.0) | 9.7 | 91.9 | |
| F | Hexane (32.6) | 13.8 | 96.3 | |
| G | Hexane (42.4) | 16.8 | 97.0 | |
| H | Hexane (60.0) | 21.8 | 97.7 | |
| I | Ether (25) | 11.1 | 96.6 | |
| J | None | 1.8 | | 75.0 |
| K | Tetrachloroethylene (47.0) | 34.0 | | 88.9 |
| L | Carbon tetrachloride (47.0) | 33.5 | | 86.5 |
| M | Toluene (47.0) | 22.2 | | 88.6 |
| N | CCl$_2$FCF$_2$Cl (47.0) | 32.6 | | 82.0 |

[1] Weight percent total diluent including the 1.8% from the benzene of the initiator solution.

As shown in EXAMPLES 101 and 102 above, copolymers form in higher conversions from monomer mixtures containing volatile diluents as compared with undiluted monomers. The same is true for monomer mixtures diluted with such nonvolatile diluents as Nujol or Aroclor. Copolymers containing such nonvolatile diluents can be isolated by baking out the unchanged chloral to leave homogeneous solids still containing the non-volatile diluent uniformly dispersed in the chloral copolymer. By extraction with a suitable solvent such as acetone the non-volatile diluent as well as the unchanged monomer can be removed to leave unmodified copolymer free of the diluent. In either case, conversion of monomers to copolymer is enhanced over the conversion realized in the absence of diluent.

EXAMPLE 103

A. Copolymers of Chloral and p-Chlorophenyl Isocyanate

A homogeneous mixture of 10 ml. of chloral, 0.6 ml. of p-chlorophenyl isocyanate and 0.4 ml. of a 1-molar solution of triphenylphosphine in benzene was prepared in a test tube at 55° C. The tube and its placid contents was cooled without shaking to 0° C. for 1.5 hours, held at room temperature for 16 hours, and then the resulting polymer plug was baked for 1 hour at 120° C. The conversion to polymer was 92.3 percent. Similar plugs to which 5 and 10% by weight of Nujol (light mineral oil) or 5 and 10 percent by weight of Aroclor (mixture of chlorinated biphenyls) had been added to the monomer mixture before polymerization was effected gave conversions to polymer of 94.9, 94.9, 93.0, and 95.7 percent, respectively. These plugs were homogeneous mixtures of copolymer with non-volatile diluent. The conversions of comonomers to copolymer were calculated from the known weights of ingredients employed and the observed weight of unchanged monomer lost on baking.

B. Copolymers of Chloral and p-Chlorophenyl Isocyanate

In the following examples 3-mm. sheets were extracted with acetone to remove not only the unchanged monomer but also the nonvolatile diluent. The enhancement of conversion by virtue of the presence of diluent during polymerization is shown.

Mixtures of 140 ml. of chloral, 9.3 ml. of p-chlorophenylisocyanate and 6.0 ml. of a 1 molar solution of triphenylphosphine in benzene at 52° C. were diluted with the amounts of Nujol or Aroclor indicated below. The resulting solutions were used in the preparation of 3-mm. clear sheets by the manner of EXAMPLE 82. The filled forms were cooled to 0° C. for 1.5 hrs. to effect polymerization. After standing overnight at room temperature each sheet was weighed, extracted with acetone for 24 hrs., dried in vacuo at 60° C., reweighed and the conversion of monomer to polymer calculated.

| Ex. No. | Diluent (g) | Total[1] wt. % diluent | % Conversion |
|---|---|---|---|
| I | none | 1.4 | 76.4 |
| II | Nujol (25) | 11.1 | 84.6 |
| III | Nujol (12.5) | 6.4 | 81.3 |
| IV | Aroclor (25) | 11.1 | 80.9 |

1) The total weight percent of diluent in the charge includes not only the added Nujol or Aroclor but also the benzene introduced as solvent for the initiator.

FOAMED POLYMERS

A prior example, No. 42, shows the formation of a foamed chloral copolymer using pentane as a solvent for the monomers. Certain fluorocarbons exhibit the same property and since chloral copolymers do not support combustion nor melt, non-drip, non-flammable foams of these polymers are highly useful in various applications such as the building materials industry.

The foamed products are obtained by dilution of the monomers before polymerization with from about 30 to 80 vol. percent of Freon 112 a, 1,1-difluorotetrachloroethane ($CCl_3CClF_2$), Freon BF, 1,2-difluorotetrachloroethane ($CCl_2FCCl_2F$), and Freon 111, monofluoropentachloroethane ($C_2Cl_5F$). These compounds are relatively high-melting compounds, melting at 40°, 26° and 100° C., respectively. They boil at 91.5, 92, and 137° C., respectively. The monomer-Freon solution is cooled to effect polymerization and then the Freon is removed in vacuo at room temperature. The fluorocarbons may be present in the polymer as solids or liquids. Chloral copolymer foams of this invention prepared with these fluorocarbons resist collapse when the fluorocarbon is evaporated off.

EXAMPLE 104

Copolymers of Chloral and p-Chlorophenyl Isocyanate

The following polymerizations were carried out in 15 mm. OD test tubes. To each was added 1.88 ml. of chloral, 0.12 ml. of p-chlorophenyl isocyanate and 8 ml. of one of the diluents specified below. Each mixture was heated to 50° C. and 0.08 ml. of a 1-molar solution of lithium-tert-butoxide in cyclohexane was added to produce uniform mixtures. Polymerization was effected by cooling the mixtures under quiescent conditions to 0° C. for 1 hour. After standing at room temperature for 16 hours., the test tubes were broken away and the diluents evaporated from the gel plugs at <0.1µ Hg pressure for 24 hours at room temperature.

| | Diluent |
|---|---|
| A | $CCl_3CClF_2$ |
| B | $C_2Cl_5F$ |
| C | $F(CF_2)_6CH_2CH_3$ |

All three pieces were of low density and had shrunk very little on evaporation of the diluent. The final plugs were 12 mm. in diameter and had been 12.6 mm. in diameter before evaporation of the diluent. The piece from B had a density of 0.24 whereas the density of unfoamed copolymer ranges from 1.8 to 2.0.

TABLE VI

The following diluents have given foam structures at the diluent/monomer ratios shown.

| Diluent | b. pt. | m. pt. | Volume Ratios |
|---|---|---|---|
| F-112A $CCl_3CClF_2$ | 92° C. | 41° C. | 3/1, 4/1, 5/1 (not at 2/1) |
| BF $CCl_2FCCl_2F/CCl_3CClF_2$ 95/5 | 92° C. | 25° C. | 5/1 (not at <5/1) |
| F-111 $C_2Cl_5F$ | 137° C. | 100° C. | 2/1, 5/1 |
| $F(CF_2)_6C_2H_5$ | 113° C. | — | 4/1 |
| Pentane | 36° C. | −130° C. | 9/1 to 3/1 |

The following diluents, although closely related to those that worked, caused the gel plug to collapse on evaporation of the diluent.

| | | b. pt. | m. pt. | No Foam at |
|---|---|---|---|---|
| F113 | $CCl_2FCClF_2$ | 48° C. | −35° C. | 5/1 to 1/1 |
| F214 | $C_3Cl_4F_4$ | 112° C. | — | 4/1 |
| | $CF_3(CH_2)_{10}CH_3$ | 214° C. | — | 4/1 |

INITIATORS

The following examples illustrate a number of additional suitable initiators and their method of preparation.

EXAMPLE 105

Tertiary Phosphine/Chloral Reaction Products

A. $(C_6H_5)_3P/CCl_3CHO$ 1/1 Salt

The salt for which H. Hoffman and H. J. Diehr in Tetrahedron Letters, 13, 583 (1962) suggested the structure $$[(C_6H_5)_3P—O—CH = CCl_2]^+ Cl^-$$

and which we have substantiated, was prepared as follows:

A solution of 52 g. of triphenyl phosphine in 200 ml. of dry ether was heated to reflux with stirring under dry nitrogen. As a solution of 25 ml. of chloral in 50 ml. of dry ether was added, a white precipitate separated with evolution of heat. The addition required about 10 min. The ether was removed by evaporation in a stream of dry nitrogen overnight at room temperature to leave 78 g. of triphenyldichlorovinyloxyphosphonium chloride. A portion (76 g.) of the product was dissolved under dry nitrogen in about 300 ml. of dichloromethane and filtered under dry nitrogen to remove about 4 g. of insoluble material. The filtrate was evaporated to about 250 ml. and diluted with about 100 ml. of petroleum ether. When only an oil separated, the mixture was evaporated to about 200 ml. and then mixed with about 100 ml. of dry diethyl ether. The colorless crystals which formed were collected on a filter under nitrogen and dried to give 48 g. of pure triphenyldichlorovinyloxyphosphonium chloride, m.p. 130°–132° C. (dec.).

Anal. Calcd. for $C_{20}H_{16}OCl_3P$: C, 58.63; H, 3.94; Cl, 25.96; P, 7.56.

Found: C, 58.31; H, 3.99; Cl, 25.46; P, 7.47.

Tertiary Phosphine/Bromal Reaction Product

B. $(C_6H_5)_3P/CBr_3CHO$ 1/1 Salt

Using the same procedure as in A, 52 g. of triphenylphosphine and 21 ml. of bromal yielded a 1/1 salt product a portion of which was recrystallized from dichloromethane/ether to yield tan crystals, m.p. 135°–142° C. (dec.).

Anal. Calcd. for $C_{20}H_{16}OBr_3P$: C, 44.23; H, 2.98; P, 5.70; Br, 44.15

Found: C, 43.99; H, 3.18; P, 5.91; Br, 44.15.

C. Aliphatic Tertiary Phosphine/Chloral 1/1 Salts

As tabulated below, 1/1 salt products were prepared from chloral and a variety of tertiary alkyl phosphines ($R_3P$) by the procedure of A above.

EXAMPLE 107
Arylaryloxy tertiary Phosphines and Their Sulfur Analogs

A. Phenyl Ester of Diphenylphosphinous Acid, $(C_6H_5)_2POC_6H_5$

Diphenylphosphinous acid chloride [$(C_6H_5)_2PCL$, 55 g.] was added to a solution of phenol (21.6 g.) and pyridine (18 g.) in 250 ml. of dry ether at 5° C. with stirring. After standing overnight, the precipitated pyridinium chloride was removed by filtration and the filtrate distilled. The phenyl ester of diphenylphosphinous acid [$(C_6H_5)_2POC_6H_5$] obtained weighed 54 g. and boiled at 145° C. at 0.1 mm.

Anal. Calcd. for $C_{18}H_{15}OP$: C, 77.69; H, 5.43; P, 11.13.

Found: C, 76.74; H, 5.51; P, 10.89.

B. Diphenyl Phenylphosphonite, $C_6H_5P(OC_6H_5)_2$

To a solution of phenol (38.0 g.) and pyridine (32 g.) in 100 ml. of dry ether was added at <10° C. a solution of phenylphosphonous acid dichloride, $C_6H_5PCl_2$, (35.8 g.) in 50 ml. of dry ether. After 1 hr. at 0° C., the pyridinium chloride was removed by filtration and the filtrate distilled. The main fraction (33 g.) of diphenyl phenylphosphonite boiled at 170° C. at 0.8 mm.

Anal. Calcd. for $C_{18}H_{15}PO_2$: C, 73.46; H, 5.14; P, 10.53.

Found: C, 73.38; H 5.39; P, 10.37.

| $R_3P$ R= | Amt. | Choral, ml. | Yield, g. (percent of theory) | M.P., °C. (d) | Analysis Calculated | | | | Found | | | |
|---|---|---|---|---|---|---|---|---|---|---|---|---|
| | | | | | C | H | P | Cl | C | H | P | Cl |
| 1. $CH_3$ | 4.8 g. | 6.7 | 13.8 | 105–130 | 26.88 | 4.51 | 13.86 | 47.60 | 24.40 | 4.19 | 12.67 | 50.31 |
| 2. $C_2H_5$ | 5.5 g. | 4.6 | 11.7 | 136–139 | 36.18 | 6.07 | 11.65 | 40.05 | 36.09 | 6.23 | 11.35 | 41.91 |
| 3. i-$C_3H_7$ | 16 ml. | 10 | 27 (90) | 114–116 | 43.93 | 7.21 | 10.07 | 34.57 | 43.85 | 7.23 | 9.90 | 34.40 |
| 4. n-$C_4H_9$ | 20 ml. | 10 | 23 | 105–108 | 48.08 | 8.08 | 8.86 | 30.42 | 49.51 | 8.51 | 8.97 | 29.57 |
| 5. t-$C_4H_9$ | 3 g. | 1.6 | 5.1 | | 48.08 | 8.07 | 8.86 | 30.42 | 43.35 | 7.07 | 8.56 | 34.53 |
| 6. cyclo-$C_6H_{11}$ | 21 g. | 8 | 18 (67) | 140–143 | 56.14 | 8.01 | 7.24 | 24.84 | 55.92 | 7.92 | 7.28 | 25.14 |

D. Triisopropylphosphine/Chloral 1/3 Product

To chloral (200 ml.) heated to 60° C. under nitrogen was added 11.5 g. of triisopropyldichlorovinyloxyphosphonium chloride (from C-3 above). The clear solution was held overnight under nitrogen at 60° C. and then poured into 400 ml. of dry ether. The oil which first separated became crystalline on standing at room temperature. The solid was collected under nitrogen and recrystallized by dissolution in 80 ml. of dichloromethane and dilution with 400 ml. of dry ether. The crystalline 3/1 chloral/triisopropylphosphine reaction product was collected and dried under dry nitrogen.

Anal. Calcd. for $C_{15}H_{24}O_3Cl_9P$: C, 29.90; H, 4.01; P, 5.14; Cl, 52.97.

Found: C, 30.47; H, 4.29; P, 5.16; Cl, 52.92.

EXAMPLE 106

Triphenylphenoxyphosphonium Phenoxide, $[(C_6H_5)_3POC_6H_5]^+ (C_6H_5O)^-$

To a solution of triphenyl dichlorophosphorane $(C_6H_5)_3PCl_2$ (33.3 g.) in 350 ml. of benzene was added at 5° C. 20.2 g. of triethyl amine in 40 ml. of benzene followed by a solution of phenol (18.8 g.) in 80 ml. of benzene. The mixture was held at 0° C. for 0.5 hr. and at room temperature overnight. The triethylammonium chloride was removed by filtration. Evaporation of the benzene left a semicrystalline residue which when treated with a mixture of cyclohexane, acetone and ether deposited 8 g. of crystalline triphenylphenoxyphosphonium phenoxide which when unionized can be called triphenyldiphenoxyphosphorane.

Anal. Calcd. for $C_{30}H_{25}PO_2$: C, 80.34; H, 5.62; P, 6.91.

Found: C, 77.08; H, 5.74; P, 6.79.

C. p-Tolyl Ester of Diphenylthiophosphinous Acid, p-$CH_3C_6H_4SP(C_6H_5)_2$

To a solution of p-methylthiophenol, p-$CH_3C_6H_4SH$ (12.6 g.) and pyridine (7.2 g.) in 150 ml. of dry ether was added at 5° C. diphenylphosphinous acid chloride $(C_6H_5)_2PCl$ (18 ml.). The precipitated pyridinium chloride was removed by filtration and the filtrate distilled to give 26 g. of p-tolyl diphenylthiophosphinite, p-$CH_3C_6H_4SP(C_6H_5)_2$ boiling at 185° C. at 0.5 mm.

Anal. Calcd. for $C_{19}H_{17}PS$: P, 10.04; S, 10.40.

Found: P, 9.89; S, 11.04.

D. Di-p-tolyl Phenylthiophosphonite, $C_6H_5P(SC_6H_4CH_3\text{-}p)_2$

To a solution of p-methylthiophenol p-$CH_3C_6H_4SH$ (38 g.) and pyridine (22 ml.) in 100 ml. of dry ether was added at <10° C. a solution of phenylphosphonous acid dichloride, $C_6H_5PCl$, (27.0 g.) in ether (50 ml.). After 1 hour, the pyridinium chloride was removed by filtration and the filtrate distilled to give 46 g. of di-p-tolyl phenylthiophosphonite (p-$CH_3C_6HS)_2PC_6H_5$ boiling at 195° C. at 0.4 mm.

Anal. Calcd. for $C_{20}H_{19}PS_2$: C, 67.77; H, 5.40; P, 8.74; S, 18.09.

Found: C, 68.16; H. 5.66; P, 8.80; S, 18.09.

EXAMPLE 108

Substituted Tertiary Aryl Phosphines

A variety of trisubstituted phosphines were prepared by adding an ethereal solution of $PCl_3$, $C_6H_5PCl_2$, or $(C_6H_5)_2PCl$ to an ethereal solution containing 3, 2, or 1 mole, respectively, of an appropriately substituted phenyl Grignard reagent, or in certain cases, the analogous organolithium derivative. The reaction mixture was hydrolyzed with an excess of aqueous ammonium chloride, the organic layer separated and dried over anhydrous magnesium sulfate. Evaporation of ether left the desired tertiary phosphine which was appropriately distilled or recrystallized depending on its physical properties.

The phosphine initiators made in this way are tabulated below.

A. Tri-p-chlorophenylphosphine (p-Cl-C$_6$H$_4$)$_3$P

The Grignard reagent from 200 g. p-chloroiodobenzene and 20.8 g. of magnesium was reacted with 15.8 ml. phosphorous trichloride to give 39 g. tri(chlorophenyl)phosphine, b.p. 228° C. at 1 mm., m.p. 103.5° C. ex ethanol.

B. p-Methoxyphenyldiphenylphosphine (C$_6$H$_5$)$_2$PC$_6$H$_4$OCH$_3$-p

The Grignard reagent from 59 g. p-iodoanisole and 7.3 g. magnesium was reacted with 44 g. diphenylphosphinous chloride. (C$_6$H$_5$)$_2$PCl to give p-methoxyphenyldiphenylphosphine which turned crystalline after distillation.

Anal. Calcd. for C$_{19}$H$_{17}$PO: C, 78.04; H, 5.86; P, 10.60.
Found: C, 77.44; H, 6.03; P, 10.10.

C. Tri-o-methoxyphenylphosphine (o-CH$_3$OC$_6$H$_4$)$_3$P

The Grignard reagent from 140 g. o-iodoanisole and 17.5 g. of magnesium was reacted with 20.6 g. phosphorous trichloride to give crystalline tri-o-methoxyphenylphosphine, m.p. 203° C.

Anal. Calcd. for C$_{21}$H$_{21}$PO$_3$: C, 71.58; H, 6.01; P, 8.79.
Found: C, 71.61; H, 6.12; P, 8.63.

D. o-Methoxyphenyldiphenylphosphine, (C$_6$H$_5$)$_2$PC$_6$H$_4$OCH$_3$-o

The Grignard reagent from 59 g. o-iodoanisole and 7.3 g. magnesium was reacted with 44 g. of diphenylphosphinous chloride to give 41 g. of diphenyl-o-methoxyphenylphosphine, m.p. 122°–123° C. ex alcohol.

Anal. Calcd. for C$_{19}$H$_{17}$PO: C, 78.08; H, 5.86; P, 10.60.
Found: C, 78.00; H, 5.99; P, 10.24.

E. Tetramesityldiphosphine [(2,4,6-(CH$_3$)$_3$C$_6$H$_2$)$_2$P]$_2$

The Grignard reagent from 120 g. mesityl bromide and 17.5 g. magnesium was reacted with 20.6 g. phosphorous trichloride to give 27 g. of what is apparently tetramesityldiphosphine, m.p. 240°–244° C. (dec.) ex ether.

F. Mesityldiphenylphosphine (C$_6$H$_5$)$_2$PC$_6$H$_2$(CH$_3$)$_3$-2,4,6

The Grignard reagent from 50 g. mesityl bromide and 7.3 g. of magnesium was reacted with 44 g. of diphenylphosphinous chloride to give 28.6 g. of diphenylmesitylphosphine, b.p. 175° C. at 0.2 mm.

Anal. Calcd. for C$_{21}$H$_{21}$P; C, 82.87; H, 6.96; P, 10.18.
Found: C, 81.82; H, 6.96; P, 10.00.

G. Tri(o-meththiomethylphenyl)phosphine (o-CH$_3$SCH$_2$C$_6$H$_4$)P$^3$

The organolithium compound from 118 g. o-bromobenzyl methyl sulfide (o—BrC$_6$H$_4$CH$_2$SCH$_3$) and 380 ml. of a hexane solution containing an equivalent amount of butyllithium was reacted with 16 ml. phosphorous trichloride to give 6 g. of solid tri(o-meththiomethylphenyl) phosphine, m.p. 89°–90° C.

Anal. Calcd. for C$_{24}$H$_{27}$PS$_3$: C, 65.12; H, 6.15; P, 7.00; S, 21.73.
Found: C, 65.48; H, 6.33; P, 7.39; S, 20.37.

H. Diphenyl-o-meththiomethylphenylphosphine, (C$_6$H$_5$)$_2$PC$_6$H$_4$CH$_2$SCH$_3$—o The organolithium derivative from 21.7 g. of o-bromobenzyl methyl sulfide (o—BrC$_6$H$_4$CH$_2$SCH$_3$) and 75 ml. of a 1.6 molar hexane solution of butyllithium was reacted with 18 ml. of diphenylphosphonous chloride to give liquid diphenyl o-meththiomethylphenylphosphine.

Anal. Calcd. for C$_{20}$H$_{19}$PS: C, 74.51; H, 5.94; P. 9.61; S, 9.95.
Found: C, 74.35; H, 6.03; P, 9.30; S, 9.56.

EXAMPLE 109

Triarylaryloxy(or thio)phosphonium Halides

A. p-Methylphenylthiotriphenylphosphonium Bromide, p-CH$_3$C$_6$H$_4$SP (C$_6$H$_5$)$_3$$^+$ Br$^-$ To a suspension of 12.3 g. of the triphenylphosphine/cyanogen bromide reaction product

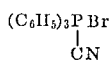

in 100 ml. of benzene at 5°–10° C. was added 4.2 g. of p-methyl thiophenol in 15 ml. of benzene to give a clear solution which was then held at 45° C. for 15 minutes. Evaporation of the benzene in vacuo at room temperature left p-methylphenylthi triphenylphosphonium bromide as an oil which turned crystalline on standing at room temperature.

Anal. Calcd. for C$_{25}$H$_{22}$PBrS: P, 6.66; S, 6.89.
Found: P, 5.61; S, 7.19.

B. p-Methylphenylthiotriphenylphosphonium Chloride, p-CH$_3$C$_6$H$_4$SP(C$_6$H$_5$)$_3$$^+$ Cl$^-$ To a suspension of 10.8 g. of the triphenylphosphine/cyanogen chloride reaction product, (C$_6$H$_5$)$_3$P(CN)Cl in 100 ml. of benzene at 5°–10° C. was added a solution of 4.2 g. of p-methylthiophenol in 15 ml. of benzene. After addition was complete, the clear solution was held at 45° C. for 20 minutes. The benzene was removed in vacuo at room temperature to leave p-methylphenylthiotriphenylphosphonium chloride.

Anal. Calcd. for C$_{25}$H$_{22}$PClS: P, 7.36; S, 7.62.
Found: P, 7.15; S, 7.82.

C. Phenoxytriphenylphosphonium Bromide, (C$_6$H$_5$)$_3$POC$_6$H$_5$ Br$^-$

To a suspension of 12.3 g. of the triphenylphosphine/cyanogen bromide reaction product (C$_6$H$_5$)$_3$P(CN)Br in 100 ml. of benzene was added at 5°–10° C. a solution of 3.1 g. of phenol in 15 ml. of benzene. The suspension was then held at 40° C. for 20 min. before collecting the phenoxytriphenylphosphonium bromide on a filter as a white solid.

Anal. Calcd. for C$_{24}$H$_{20}$POBr: P, 7.12; Br, 18.36.
Found: P, 6.41; Br, 23.13.

D. Phenoxytriphenylphosphonium Chloride, (C$_6$H$_5$)$_3$POC$_6$H$_5$ Cl$^-$

To a suspension of 10.8 g. of the reaction product from triphenylphosphine and cyanogen chloride (C$_6$H$_5$)$_3$P(CN)Cl in 100 ml. of benzene was added with cooling a solution of 3.1 g. of phenol in 15 ml. of benzene. The mixture was heated to 45° C. for 20 minutes and then cooled. The solid phenoxytriphenylphosphonium chloride was collected, washed with benzene and then pentane and dried to give 12.9 g. of product.

Phenoxydiphenylmethylphosphonium Iodide,

C$_6$H$_5$OP(CH$_3$)(C$_6$H$_5$)$_2$$^+$ I$^-$

To a solution of 10.5 g. of phenyl diphenylphosphinite (from Example 107 A) in 30 ml. of dry ether was added 2.38 ml. of methyl iodide. After standing 3 days at room temperature, the suspended solid reaction product was collected on a filter and dried to give 9.7 g. of phenoxydiphenylmethylphosphonium iodide, m.p. 151°–153°C. (dec.).

Anal, Calcd. for C$_{19}$H$_{18}$POI: P, 7.37; I, 30.20.
Found: P, 7.33; I, 30.40.

ADDITIONAL POLYMERS

The following examples are additional illustrations of the preparation of the polymers of the invention.

EXAMPLE 110

Copolymers of Chloral and p-Chlorophenyl Isocyanate

In each of a series of test tubes a mixture of 15.11 g. of chloral and 0.6 ml. of p-chlorophenylisocyanate was heated to 55° C. under a blanket of dry nitrogen before adding 0.2 g. of initiator to produce a homogeneous mixture. After 5 to 10 minutes at 55° C. during which time no polymerization occurred, the tubes with their contents were placed under quiescent conditions in a 0° C. bath for 1.5 hour and then held at room temperature overnight. A solid plug of copolymer was formed in each case. The plugs were heated for 1 hour at 120° C. and the weight loss noted.

| Exp. No. | Initiator Structure | Initiator Ex. | % Wt. lost 1 hr./120°C |
|---|---|---|---|
| A[1] | 3/1 CCl$_3$CHO/[(CH$_3$)$_2$CH]$_3$P product | 105–D | 9.4 |
| B | (C$_6$H$_5$)$_3$P(OC$_6$H$_5$)$_2$ | 106 | 15.8 |
| C | (C$_6$H$_5$)$_2$POC$_6$H$_5$ | 107–A | 6.0 |
| D | C$_6$H$_5$P(OC$_6$H$_5$)$_2$ | 107–B | 23.6 |
| E | (C$_6$H$_5$)$_2$PSC$_6$H$_4$CH$_3$—p | 107–C | 8.2 |
| F | C$_6$H$_5$P(SC$_6$H$_4$CH$_3$-p)$_2$ | 107–D | 13.6 |
| G | (C$_6$H$_5$)$_2$PC$_6$H$_4$ OCH$_3$—p | 108–B | 14.8 |
| H | o—CH$_3$OC$_6$H$_4$P(C$_6$H$_5$)$_2$ | 108–D | 9.9 |
| I | [(2,4,6-(CH$_3$)$_3$C$_6$H$_2$)$_2$P]$_2$ | 108–E | 17.2 |
| J | 2,4,6-(CH$_3$)$_3$C$_6$H$_2$P(C$_6$H$_5$)$_2$ | 108–F | 7.3 |
| K | (o—CH$_3$SCH$_2$C$_6$H$_4$)$_3$P | 108–G | 8.9 |
| L | o—CH$_3$SCH$_2$C$_6$H$_4$P(C$_6$H$_5$)$_2$ | 108–H | 8.9 |
| M | p—CH$_3$C$_6$H$_4$SP(C$_6$H$_5$)$_3$$^+$Br$^-$ | 109–A | 40.7 |
| N | p—CH$_3$C$_6$H$_4$SP(C$_6$H$_5$)$_3$$^+$Cl$^-$ | 109–B | 26.8 |
| O | C$_6$H$_5$OP(C$_6$H$_5$)$_3$$^+$Br$^-$ | 109–C | 10.6 |
| P | C$_6$H$_5$OP(C$_6$H$_5$)$_3$$^+$Cl$^-$ | 109–D | 20.26 |
| Q | C$_6$H$_5$OP(C$_6$H$_5$)$_2$CH$_3$$^+$I$^-$ | 109–E | 8.4 |
| R | (p—CH$_3$C$_6$H$_4$)$_3$P | (2) | 8.6 |
| S | (o—CH$_3$C$_6$H$_4$)$_3$P | (2) | 8.4 |
| T | Br(CH$_2$)$_3$P(C$_6$H$_5$)$_3$$^+$Br$^-$ | (2) | 26.2 |
| U | HO(CH$_2$)$_2$P(C$_6$H$_5$)$_3$$^+$Cl$^-$ | (2) | 32.3 |
| V | (C$_8$H$_{17}$)$_3$PCH$_3$$^+$(CH$_3$O)$_2$PO$_2$ | (2) | 36.5 |
| W[3] | (CH$_2$=CH)$_3$P | (2) | 26.2[4] |
| X[3] | (C$_2$H$_5$)$_3$N | (2) | 28.3[4] |
| Y[3] | N-ethyl morpholine | (2) | 44.2[4] |
| Z[3] | pyridine | (2) | 37.6[4] |

(1) Initiator (0.24 g.)/monomer mixture held for 1 hour at 60°C. before cooling.
(2) Commercially available.
(3) Initiator (0.4 mole %) added at 65°C.
(4) After 24 hr. at 100°C.

hour at 120° C.) in air, (3) baked as in (2) followed by soaking or continuous extraction in a solvent for the unchanged chloral (acetone, methanol, water, chlorinated hydrocarbons, hydrocarbons, etc.), or (4) directly (without baking) soaked or continuously extracted in such solvents. The solvent extracted sheets resulting from (3) or (4) were then dried in vacuo at 50°–60°C. until all traced of the solvent had been removed. The results are summarized in the Table below. B. A mixture of 140 ml. of freshly distilled chloral and 9.3 ml. p-chlorophenyl isocyanate (95/5 molar ratio) was heated to 52° C. under nitrogen. A 1-molar solution (6.0 ml.) of the 1/1 triisopropylphosphine/chloral salt (of Example 105–C–3) in chloroform was added and the resulting solution was used as described above (Example 111-A) to prepare a 3-mm. sheet. After the polymerized sheet had been after-treated as in Example 111-A (4) by acetone extraction, there was obtained a clear colorless sh sheet in 73 percent conversion. The sheet was useful as a transparent glazing panel.

The following examples illustrate the use of many of the initiators for the preparation of 3 mm. sheets of copolymer (95/5 mole ratio chloral/p-chlorophenyl isocyanate) following the general procedure outlined above in section A and the amounts of reagent given in section B.

EXAMPLES 112–117

Chloral/p-Chlorophenyl Isocyanate Copolymers

In each of the following examples the indicated amounts of chloral and p-chlorophenyl isocyanate were combined and to this solution was added 0.2 ml. of dimethylformamide and 0.8

| Example | Initiator Structure | Example | Percent conversion following after treatments of Ex. 111-A | | | | | |
|---|---|---|---|---|---|---|---|---|
| | | | 1 | 2 | 3[1] | 4[1] | 4[2] | 4[4] |
| C | (C$_6$H$_5$)$_3$POCH=CCl$_2$$^+$ Cl$^-$ | 105–A | 89.0 | | | | | |
| D | (CH$_3$)$_3$POCH=CCl$_2$$^+$ Cl$^-$ | 105–C–1 | 65.3 | 37.6 | | | | |
| E | (C$_2$H$_5$)$_3$POCH=CCl$_2$$^+$ Cl$^-$ | 105–C–2 | 73.9 | 52.8 | | | | |
| F | (i-C$_3$H$_7$)$_3$POCH=CCl$_2$$^+$ Cl$^-$ | 105–C–3 | 85.4 | 65.5 | | | | |
| G | (n-C$_4$H$_9$)$_3$POCH=CCl$_2$$^+$ Cl$^-$ | 105–C–4 | 77.1 | 55.2 | | | | |
| H | (t-C$_4$H$_9$)$_3$POCH=CCl$_2$$^+$ Cl$^-$ | 105–C–5 | 88.6 | 71.2 | | | | |
| I | (Cyclo-C$_6$H$_{11}$)$_3$POCH=CCl$_2$$^+$ Cl$^-$ | 105–C–6 | 78.0 | 54.3 | | | | |
| J | C$_6$H$_5$)$_3$POCH=CBr$_2$$^+$ Br$^-$ | 105–B | 75.0 | | | | | |
| K | (C$_6$H$_5$)$_3$PCl$_2$ | (*) | 73.1 | | 68.4 | 70.1 | | |
| L | (p-ClC$_6$H$_4$)$_3$P | 108–A | 79.7 | | 69.5 | 78.8 | | |
| M | (C$_6$H$_5$)$_2$POC$_6$H$_5$ | 107–A | 88.8 | | 78.7 | 93.1 | | |
| N | (n-C$_{12}$H$_{25}$)$_3$N | (*) | 83.2 | | | | | |
| O | (C$_2$H$_5$)$_4$N$^+$ Cl$^-$ | (*) | 81.6 | 62.2 | | | | |
| P[3] | (C$_6$H$_5$)$_3$As | (*) | 69.6 | | | | | 44.3 |
| Q[3] | (C$_6$H$_5$)$_3$Sb | (*) | 90.6 | 5 51.9 | | | | 41.2 |
| R[3] | (C$_6$H$_5$)$_2$P(CH$_2$)$_2$P(C$_6$H$_5$)$_2$ | (*) | | 5 64.4 | | | | 87.9 |
| S[3] | C$_6$H$_5$P(C$_2$H$_5$)$_2$ | (*) | 98.2 | 5 90.4 | | | | 78.5 |

*= Commercially available.
1 Acetone as extractant.
2 Chloral as extractant.
3 Initiator (0.4 mole percent) added to 80 ml. chloral and 4.96 ml. p-ClC$_6$H$_4$NCO at 65° C.
4 Carbon tetrachloride as extractant.
5 After 24 hrs. at 100° C.

EXAMPLE 111

⅛-Inch Sheets of Copolymers

A. GENERAL PROCEDURE

For the purpose of preparing a clear, transparent sheet, a 3-mm. thick mold was prepared from two sheets of glass (180 mm. × 280 mm.) and a length of 6 mm. OD × 1.5 mm. wall gum rubber tubing as described in Example 52, but no glass wool was used between the plates. A mixture of freshly distilled chloral with the desired amount of a suitable comonomer and, if desired, an inert diluent was heated under a blanket of dry nitrogen to a temperature in excess of the polymerization threshold temperature commonly in the range of 40°–65° C., before the initiator was added and allowed to mix. After the initiated mixture was homogeneous, it was used to fill the mold which had been preheated to at least the temperature of the initiated monomer. The filled mold was then cooled under quiescent conditions, usually in a 0° C. bath, for long enough to complete the polymerization; commonly 1.0 to 1.5 hours. After warming to room temperature overnight, the polymerized sheet was after-treated in various ways to remove the few percent of unchanged chloral still present. Alternately, it was (1) allowed to air dry, (2) baked (for example for 1 ml. of acetonitrile. The resulting solution was heated to 50° C. and thoroughly mixed with the amount of initiator solution (1 molar lithium chloride in dimethylformamide) indicated. The quiescent mixture was then cooled without agitation to the temperature shown for the period indicated. The resulting polymerizate was dissolved in toluene. The solution was clarified by filtration and the filtrate poured into a large excess of methanol to precipitate the chloral/p-chlorophenyl isocyanate copolymer. After being washed thoroughly with methanol, the product was dried, weighed, and analyzed for nitrogen content, from which the mole percent of $$-\underset{\underset{O}{\|}}{C}-N(C_6H_4Cl)-$$

groups and chloral groups in the copolymer was calculated.

| Example | 112 | 113 | 114 | 115 | 116 | 117 |
|---|---|---|---|---|---|---|
| Chloral (ml.) | 5 | 6.5 | 5.4 | 3.4 | 2.5 | 1.6 |
| p—ClC$_6$H$_4$NCO (ml.) | 3.6 | 4.2 | 6.2 | 8.6 | 9.8 | 11.0 |
| Initiator (ml.) | 0.27 | 0.2 | 0.27 | 0.27 | 0.27 | 0.3 |
| hr. at 0°C. | 1 | 1 | 2 | 2 | 2 | 0 |
| hr. at room temp. | 16 | 16 | 16 | 16 | 16 | 16 |

| g. copolymer | 7.5 | 13 | 12.0 | 9.7 | 7.7 | 4.8 |
| --- | --- | --- | --- | --- | --- | --- |
| % N in copolymer | 3.44 | 3.51 | 3.84 | 4.33 | 4.86 | 4.94 |
| mole % isocyanate in copolymer | 36.5 | 37.5 | 41.1 | 46.5 | 52.3 | 53.1 |
| mole % chloral in copolymer | 63.5 | 62.5 | 58.9 | 53.5 | 47.7 | 46.9 |

EXAMPLE 118

Chloral/Phenyl Isocyanate Copolymer

To a solution of 9 ml. of phenyl isocyanate and 1 ml. of chloral in 30 ml. of dimethylformamide (freshly distilled off $P_2O_5$) at 25° C. was added 2.0 ml. of a saturated solution of sodium cyanide in dry dimethylformamide. After the initiator solution was thoroughly mixed with the solution of monomers, the quiescent mixture was cooled without agitation to −50° C., held at −25° C. overnight, and then allowed to warm to room temperature. The resulting polymer solution was poured into a large volume of methanol to precipitate the polymer, which was washed thoroughly with methanol and dried to give 1.9 g. of chloral/phenyl isocyanate copolymer. The product was found to contain 5.04, 5.05 weight percent of nitrogen, which corresponds to 47.5 mole percent of

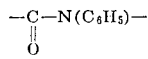

units and 52.5 mole percent of chloral units in the polymer. The polymer was soluble in chloroform.

EXAMPLE 119

The procedure of Example 118 was repeated using 9.5 ml. of phenyl isocyanate and 0.5 ml. of chloral. There was obtained 1.2 g. of chloroform-soluble copolymer having 5.65, 5.67 weight percent of nitrogen (53.5 mole percent of combined phenyl isocyanate units and 46.5 mole percent of chloral units).

Several of the process and product modifications shown in this specification are applicable in the preparation and modification of chloral homopolymers of the type shown in my U.S. Pat. No. 3,454,527.

It has been noted above that the conversion of chloral to its homopolymer is enhanced when aprotic liquids such as hydrocarbons, halocarbons and ethers are present during polymerization. Chloral homopolymer may further be stabilized by heat treatment as in Example 97, by solvent extraction as in Example 98, and by incorporation of ultraviolet light screen agents as in Examples 99 and 100. Polychloral can be prepared in foam or sponge form by following the procedures of Example 104. The initiators shown in Examples 105 to 111 are also suitable for effecting the cryotachensic homopolymerization of chloral.

I claim:

1. An addition copolymer of chloral and at least one comonomer of the formula $R^3-N=C=X$ wherein X is selected from the group consisting of oxygen and sulfur; $R^3$ is a halogen substituted radical selected from the group consisting of alkyl and cycloalkyl of up to 18 carbons, aryl of six to 18 carbons, and alkaryl and aralkyl of seven to 24 carbons, said halogen substituent being selected from the group consisting of fluorine, chlorine, bromine and iodine, the copolymer containing from 1 to 99.9 mol percent of chloral.

2. A copolymer of claim 1 in the form of an article of manufacture.

3. A copolymer of claim 1 in the form of a film.

4. A copolymer of claim 1 in the form of a fiber.

5. A copolymer of claim 1 in the form of a sheet.

6. A copolymer of claim 1 in the form of a pipe.

7. A copolymer of claim 1 containing an inorganic filler.

8. A copolymer of claim 1 stabilized against weight loss from heat.

9. A copolymer of claim 1 containing from about 50 to 99.9 mol percent of chloral.

10. A copolymer of claim 9 in which the comonomer is p-chlorophenyl isocyanate.

11. A copolymer of claim 1 containing from about 80 to 99.9 mol percent of chloral.

12. A copolymer of claim 11 wherein the comonomer is p-chlorophenyl isocyanate.

13. The process of making a copolymer of chloral and at least one comonomer of the formula $R^3-N=C=X$ where X is selected from the group consisting of oxygen and sulfur; $R^3$ is a halogen substituted radical selected from the group consisting of alkyl and cycloalkyl of up to 18 carbons, aryl of six to 18 carbons, and alkaryl and aralkyl of seven to 24 carbons, said halogen substituent being selected from the group consisting of fluorine, chlorine, bromine and iodine comprising forming, at a temperature above its threshold polymerization temperature, a quiescent homogeneous mixture of the monomers and an effective amount of an anionic polymerization initiator, cooling the quiescent mixture below its threshold polymerization temperature to effect polymerization of the monomers, and maintaining the mixture quiescent during the polymerization process.

14. The process of claim 13 carried out in the presence of an aprotic solvent which is inert to the monomers and initiator and is liquid at the polymerization temperature.

15. The process of claim 13 wherein the aprotic solvent is a hydrocarbon.

16. The process of claim 13 wherein the aprotic solvent is a halogenated hydrocarbon.

17. The process of claim 13 wherein the process is carried out in a mold to produce a shaped copolymer.

18. The process of making a copolymer of chloral and at least one comonomer of the formula $R^3-N=C=X$ where X is selected from the group consisting of oxygen and sulfur; $R^3$ is a halogen substituted radical selected from the group consisting of alkyl and cycloalkyl of up to 18 carbons, aryl of six to 18 carbons, and alkaryl and aralkyl of seven to 24 carbons, said halogen substituent being selected from the group consisting of fluorine, chlorine, bromine and iodine comprising forming, at a temperature above its threshold polymerization temperature, a quiescent homogeneous mixture of chloral and an effective amount of an anionic polymerization initiator, cooling the quiescent mixture below its threshold polymerization temperature to effect homopolymerization of part of the chloral under quiescent conditions, and then adding the at least one comonomer as set out above and causing it to copolymerize with at least the remaining free chloral.

19. The process of claim 18 in which about 60 percent of the original quantity of chloral is polymerized to homopolymer under quiescent conditions.

20. An unpolymerized liquid mixture of chloral and at least one comonomer of the formula $R^3-N=C=X$ wherein X is selected from the group consisting of oxygen and sulfur; $R^3$ is a halogen substituted radical selected from the group consisting of alkyl and cycloalkyl of up to 18 carbons, aryl of six to 18 carbons, and alkaryl and aralkyl of seven to 24 carbons, said halogen substituent being selected from the group consisting of fluorine, chlorine, bromine and iodine, said unpolymerized mixture containing from 1 to 99.1 mol percent of chloral.

21. A liquid mixture of claim 20 containing from about 50 to 99.9 mol percent of chloral.

22. A liquid mixture of claim 20 containing from about 80 to 99.9 mol percent of chloral.

23. A liquid mixture of claim 20 containing 0.001 to 10 percent by weight of the combined weight of chloral and comonomer(s) present, of an anionic polymerization initiator, said unpolymerized liquid mixture being maintained above its threshold polymerization temperature.

24. A liquid mixture of claim 20 containing 0.01 to 70 percent by weight of an inorganic filler.

25. A liquid mixture of claim 22 containing p-chlorophenyl isocyanate as a comonomer.

* * * * *

PO-1050
(5/69)

UNITED STATES PATENT OFFICE
CERTIFICATE OF CORRECTION

Patent No. 3,668,184                    Dated June 6, 1972

Inventor(s)    Otto F. Vogl                                       - 1 -

It is certified that error appears in the above-identified patent and that said Letters Patent are hereby corrected as shown below:

Col. 2, line 64, "N C X" should be -- N=C=X --;

Col. 8, Table I, Example 6, Col. C, "20.23" should be -- 22.23 --.

Col. 12, Table II, Col. heading, "Mol chloral" should be -- Mol percent chloral --.

Col. 15, Table IV, Col. heading, "G." should be -- g. --.

Col. 16, Table IV, Example 73, "4.6P" should be -- 4.6F --; Table IV, Example 74, "24.0P" should be -- 24.0F --.

Col. 21, Example 95, In the formula "O" should be -- $\overset{O}{\underset{\|}{\wedge}}$ --.

Col. 24, in the column headed "Extraction temp. °C.":

| " *60 " | should be | -- *r.t. 60 -- |
| " *60 " | should be | -- r.t. 60 -- |
| " *60 " | should be | -- r.t. 60 -- |
| " *60 " | should be | -- r.t. 60 -- |
| "  60 " | should be | -- r.t. -- |
| "  60 " | should be | -- r.t. 60 -- |
| "  60 " | should be | -- r.t. -- |
| "  60 " | should be | -- r.t. 60 -- |

* room temperature (continued next sheet)

UNITED STATES PATENT OFFICE
CERTIFICATE OF CORRECTION

Patent No. 3,668,184  Dated June 6, 1972

Inventor(s) Otto F. Vogl

- 2 -

It is certified that error appears in the above-identified patent and that said Letters Patent are hereby corrected as shown below:

Col. 25, line 19, "$Ph_2C$" should be -- $Ph_2C=$ --.

Col. 27, line 66, "$CCl_2FCCl$" should be -- $CCl_2FCCl_2F$ --.

Col. 30, line 60, "$CH_3C_6HS$" should be -- $CH_3C_6H_4S$ --.

Col. 31, line 46, "$C_6H_4)P^3$" should be -- $C_6H_4)_3P$ --.

Col. 32, line 5, "o" is omitted in -- thio --; line 25, "$(C_6H_5)_3POC_6H_5Br^-$" should be -- $(C_6H_5)_3POC_6H_5^+Br^-$ --; line 37, "$(C_6H_5)_3POC_6H_5Cl^-$" should be -- $(C_6H_5)_3POC_6H_5^+Cl^-$ --.

Col. 33, Exp. No. V: "$(C_8H_{17})_3PCH_3^+(CH_3O)_2PO_2$" should be -- $(C_8H_{17})_3PCH_3^+(CH_3O)_2PO_2$ --.

Signed and sealed this 13th day of March 1973.

(SEAL)
Attest:

EDWARD M. FLETCHER, JR.
Attesting Officer

ROBERT GOTTSCHALK
Commissioner of Patents